(12) United States Patent
Adams

(10) Patent No.: US 8,352,926 B2
(45) Date of Patent: Jan. 8, 2013

(54) METHOD AND APPARATUS FOR A CROSS-PLATFORM TRANSLATOR FROM VB.NET TO JAVA

(76) Inventor: Megan Adams, San Francisco, CA (US)

( * ) Notice: Subject to any disclaimer, the term of this patent is extended or adjusted under 35 U.S.C. 154(b) by 1214 days.

(21) Appl. No.: 12/217,671

(22) Filed: Jul. 8, 2008

(65) Prior Publication Data

US 2009/0031291 A1 Jan. 29, 2009

Related U.S. Application Data

(60) Provisional application No. 60/959,027, filed on Jul. 9, 2007.

(51) Int. Cl.
*G06F 9/45* (2006.01)
(52) U.S. Cl. ...................................................... 717/137
(58) Field of Classification Search .................... 717/137
See application file for complete search history.

(56) References Cited

U.S. PATENT DOCUMENTS 6,305,009 B1 * 10/2001 Goor ............................ 717/116
7,627,861 B2 * 12/2009 Smith et al. ................... 717/144
2007/0169010 A1 * 7/2007 Garner et al. ................. 717/136

\* cited by examiner

*Primary Examiner* — Henry Tsai
*Assistant Examiner* — Eric Oberly
(74) *Attorney, Agent, or Firm* — William C. Milks, III

(57) ABSTRACT

A method and system for translating source code in one logically distinct object oriented language on one platform into another object oriented language on another platform. This includes the translation of the classes and statements in the original source. It also includes the creation of object oriented interfaces for all types and services used in the source code whose definitions are not provided. Once the source code classes are translated, a complete object oriented interface to the target platform is generated. Type inference analysis is performed on the input source code in order to infer types for undeclared services and to infer type hierarchies for undeclared types. Type inference analysis is utilized to generate object oriented interfaces for all types and services used in the source code whose definitions are not available. The method and system also have the capability of generating, on an as needed basis, specific bridge classes which support bridging the platform differences between the target and the source platform.

4 Claims, 19 Drawing Sheets

Bridge Types for Primitive Values
Use IntegerBridge for GetType(), a service not supported by Java int

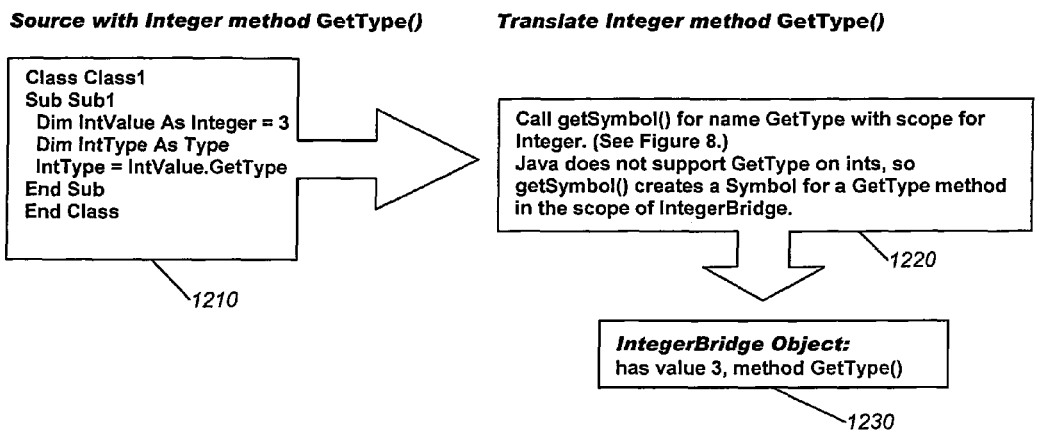

*Source with Integer method GetType()*

```
Class Class1
Sub Sub1
  Dim IntValue As Integer = 3
  Dim IntType As Type
  IntType = IntValue.GetType
End Sub
End Class
```
↘ 1210

*Translate Integer method GetType()*

Call getSymbol() for name GetType with scope for Integer. (See Figure 8.)
Java does not support GetType on ints, so getSymbol() creates a Symbol for a GetType method in the scope of IntegerBridge.
↘ 1220

*IntegerBridge Object:*
has value 3, method GetType()
↘ 1230

*Target output: invoke GetType () on IntegerBridge:*

```
class Class1
  void sub1() {
    int IntValue = 3;
    Class IntType = null;
    IntType = (new IntegerBridge(intValue)).GetType();
  }
}
```
↘ 1240

*IntegerBridge Object*
1. a temporary object, created with the primitive value.
2. created upon need, e.g. if Java object model does not support requested service on the primitive type.
3. type inferrence creates any needed services, e.g. GetType() in the class IntegerBridge, with appropriate signature.
4. functions as a wrapper for the underlying primitive value, e.g. '3'.

METHOD AND APPARATUS FOR A CROSS-PLATFORM TRANSLATOR FROM VB.NET TO JAVA

CROSS-REFERENCE TO RELATED PATENT APPLICATION

This application relates to U.S. Provisional Patent Application No. 60/959,027 filed on Jul. 9, 2007, entitled Method and Apparatus for a Cross-Platform Translator from VB.Net to Java, the content of which is hereby incorporated herein in its entirety by this reference.

BACKGROUND OF THE INVENTION

1. Field of the Invention

The method and apparatus of this invention relate generally to the translation of one logically distinct object oriented language on one platform into another object oriented language on another platform. More specifically, the method and apparatus relate to a system and process for translating computer programs in a language having the attributes VB.Net 2003 on the platform .Net into computer programs having the attributes of Java (1.4.2) on the Java platform.

REFERENCES

1. U.S. Pat. No. 4,374,408 Bowles, et al. February 1983. Multi-pass system and method for source to source code translation
2. U.S. Pat. No. 5,230,049 Chang, et al. July 1993 Program source code translator
3. U.S. Pat. No. 5,761,511 Gibbons, et al. June 1998 Method and apparatus for a type-safe framework for dynamically extensible objects
4. U.S. Pat. No. 6,182,281 Nackman, et al. January 2001 Incremental compilation of C++ programs
5. U.S. Pat. No. 6,195,792 Turnbull, et al. February 2001 Software upgrades by conversion automation
6. U.S. Pat. No. 6,230,117 Lymer, et al. May 2001 System for automated interface generation for computer programs operating in different environments
7. U.S. Pat. No. 6,346,945 Mansurov, et al. February 2002 Method and apparatus for pattern-based flowcharting of source code
8. U.S. Pat. No. 6,453,464 Sullivan September 2002 Method and apparatus for converting COBOL to Java
9. U.S. Pat. No. 6,523,171 Dupuy, et al. February 2003 Enhanced source code translator from procedural programming language (PPL) to an object oriented programming language (OOPL)
10. U.S. Pat. No. 6,604,105 Roth August 2003 Processing a directed graph of objects
11. U.S. Pat. No. 7,047,447 Cantrill May 2006 Method and system for postmortem object type identification
12. Kim B. Bruce, Foundations of Object-Oriented Programming Languages: Types and Semantics, The MIT Press, 2002.
13. Alfred V. Aho, Ravi Sethi, and Jeffrey D. Ullman, Compilers: Principles, Techniques, and Tools, Addison Wesley, 1986.
14. Benjamin C. Pierce (Editor) Advanced Topics in Types and Programming Languages (Hardcover), The MIT Press, 2004.

2. Description of the Prior Art

Object oriented (OO) languages have been developed to improve code reuse and modularity. They are a substantial advance from earlier procedural languages. Object oriented programming has emerged as the dominant computer programming style.

Most object oriented languages support the fundamental concepts of object oriented programming. These fundamental concepts include "class" and "object". A class defines the characteristics (data) of objects and the things those objects can do (their methods). Classes can be instantiated to create objects. Classes are arranged in a class "hierarchy" within which classes can "inherit" from other classes. The derived class inherits the data and methods of the base class and can add its own data and methods, thereby specializing the functionality of a base class without modifying the base class itself. This supports reuse of the base class. In the object oriented paradigm, the data of an object is "encapsulated", meaning that it is accessed only through the methods of the class. In effect, objects are accessed through interfaces defined by the methods in the class. This promotes code reuse by allowing the underlying implementation within the class to change, and as long as the interface does not change, users of the class will not be affected. For additional modularity and flexibility, most object oriented languages also define pure interfaces which have no implementations at all. This improves modularity and the separation of interface from implementation. Object oriented languages generally also support "polymorphism" via inheritance, which is often called subtyping polymorphism. This means that if a function takes a parameter with a base class type, that function will also accept a parameter of a class derived from that base class, because an object of the derived class will support all the methods of the base class, due to the rules of inheritance. This is often called the Liskov Substitution Principle: if S is a subtype of T, then objects of type T in a program may be replaced with objects of type S without altering the correctness of the program.

Code reuse in the object oriented paradigm depends on the separation of interface from implementation. The services that classes provide are described by their interfaces. It is not necessary to understand the details of the underlying implementation, so users of the class are protected from changes in that underlying implementation. Services are named in such a manner as to make their functionality apparent. Thus classes can be used in contexts other than the one for which they were originally designed, and this supports the goal of code reuse.

Most object oriented languages support the same fundamental concepts because programming language design has converged on the most powerful and useful concepts. VB.Net and Java support the fundamental object oriented concepts described above. For example, classes for Bank Accounts in both languages could be designed in an identical manner, with account data encapsulated within the Bank Account objects, accessed only through methods and security protocols in the class interface. A Savings Account class and a Checking Account class could be defined to derived from Bank Accounts in a manner identical in both languages. The functions in these classes could be polymorphic in both languages, because both languages support subtyping polymorphism.

Object oriented languages support code reuse within the domain of a specific language and the platform which supports that language. To support code reuse of a VB.Net class within a Java application, translation is required. Such translation has two aspects: language and platform. Prior art translators have focused on language features with modest results (VB2Java, for example) but have not grappled with the abundance and complexity of differences in platform. The sheer complexity of the platforms themselves has made it impractical to implement translators which understand each platform in such detail that they can translate functionality from one platform to another in an automatic, transparent, and robust fashion. One difficulty which has contributed to this being an insurmountable problem is that the differences between platforms are not static. They can change with any platform release, meaning that any platform definitions which the translator might assume are inherently unstable. Also, in general, the encapsulation supported by object oriented languages does not include encapsulation with respect to platform. Dependencies upon the underlying platform are present throughout the source code (the source code is not modular with respect to the underlying platform). Therefore, manual translation is required in whole or in part when moving source code to a different platform, and this in practice prevents code reuse completely for a wide class of applications.

Known translators of the prior art first perform a lexical analysis of the source code. They tokenize the input stream into keywords, identifiers, and separators, and then parse the token stream. This is a syntactical analysis which requires recognizing the input stream according to the rules of a grammar. This syntactical analysis is defined by the rules of the language definition. This aspect of translation is also known in standard modern compiler technology (for compilers behave in some respects like translators of source code into object code). After syntactical analysis, based on keyword and statement type, translators of the prior art perform a translation from input source code to target language. Some translators of the prior art analyze the types used in the source program and implement the type checking rules of the language definition. Some translators of the prior art do not analyze the types or do any type checking.

SUMMARY OF THE INVENTION

It is an object of the present invention to provide a method and apparatus to translate source code in one object oriented language on one platform into source code in another object oriented language on another platform. The source code resulting from translation by one embodiment of the present invention can be separated into two parts. The first part is a translation of the classes and statements in the original source code. The second part is contained in the translation interfaces directory, and this part is generated by one embodiment of the present invention as a result of analyzing the platform services used in the original source and inferring the types and type hierarchies that are used, but not declared, in the original source. It is the second part, the translation interfaces directory and its contents, which specifically supports translation across different platforms.

Accordingly, one embodiment of the translation method in accordance with the present invention comprises the steps of:
1. performing a lexical and syntactic analysis of the input source code;
2. entering the information about all type definitions and other names defined in the input source code into the symbol table;
3. transforming each input source code type definition or module definition into a parse tree;
4. performing a type dependency analysis on the input source tree(s), in which it is noted which objects of unknown type share a type;
5. performing type inference analysis on the input source tree(s), in which members of classes whose definition is not available in the input source code have their types and signatures inferred from their use, and propagating inferred types to any objects of unknown type which share the inferred type;
6. determining from the characteristics of the use of undeclared names, what kind of names they are (method, class, interface, property, etc);
7. analyzing the types of the source and target operands in expressions and recording the inferred subtyping relationship in the supertype set;
8. performing a type hierarchy analysis on all types referenced in the input source code whose definition is not available, in which a hierarchy for those types is detected and defined;
9. performing a final type inference analysis on the input source tree(s), in which the results of the type hierarchy analysis is used to refine the inferred types;
10. performing a tree traversal on the input source tree(s) and generating the translated code for the classes and statements in the input source code;
11. generating the translation interfaces directory and its contents for platform references and types whose definition is unavailable in the original source.

Apparatus is also provided in accordance with one embodiment of the present invention to perform the translation method.

With translation in accordance with one embodiment of the present invention, once the source code classes are translated, a complete object oriented interface to the target platform is generated. Invocations of platform services detected in the source program which are not directly supported on the target platform result in the production of classes and methods in the translation interfaces directory. (As an example, the invocation of service Timer( ) is detected in the source program, where that specific invocation of service Timer( ) is not supported on the target platform.) References to types whose definition is not available in the input source code will result in the production of classes and methods in the translation interfaces directory. (As an example, undeclared types in the input source are analyzed, and the definitions of these types are output to the translation interfaces directory.) Subtyping in undeclared types is detected, and that will be expressed in the class hierarchy in the translation interfaces directory. (As an example, a hierarchy between undeclared types is detected and expressed in the translation interfaces directory.)

The translation method and apparatus in accordance with the embodiments of the present invention generate a complete object oriented interface to the target platform for the source program. The translation interfaces directory contains definitions for all types and services used but not declared by the source program. These type definitions will contain method definitions, some of which are fully implemented methods and some of which are not fully implemented (meaning they are without method bodies). The translation method and apparatus in accordance with the embodiments of the present invention will have its own built-in mapping of source platform to target platform functionality. When that mapping applies, the platform functionality will be fully implemented in method definitions in the classes in the translation interface directory. When no mapping applies, the translation interface directory will contain a stub (without a method body) for the service in the appropriate class. This is a flexible and robust approach that can handle unpredictable and incompatible changes in the source and target platform definition. This functionality also allows the translation method and apparatus to handle in a robust and flexible fashion the translation of specific user coded source classes without requiring that the whole user coded application containing those specific classes, with all their referenced types, be translated. This supports code reuse of individual user coded classes across platforms.

DEFINITIONS OF TERMS

Object Kind

Object names may have different kinds. If the object name is the name of a method, the object kind is method, whereas if the object name is the name of a class, the object kind is class, and so on. The present invention provides a method and apparatus to infer types of objects from their uses, because the present invention supports translation when type declarations are unavailable. Type inference as embodied in the present invention increases in precision through iterations over the source code. During this process, the kind of an object name can change. The final kind of the object is what will appear in the translated code.

Object Model

A description of an object oriented architecture, including the details of the object structure, interfaces between objects and other object oriented features and functions. The language differences between VB.Net and Java imply and define differences in object model between the two languages. These differences are distinct from platform differences.

Platform

The software architecture of the environment within which the software executes. For Java, it is the Java platform, including all standard class libraries. For VB.Net, it is the .Net platform, including all standard classes and libraries.

Platform Differences

Underlying services (class libraries) provided by different platforms have different interfaces. These differences are the platform differences.

Source Platform

The source platform in a preferred embodiment of the present invention is the .Net platform.

Target Platform

The target platform in a preferred embodiment of the present invention is the Java platform.

Translation Interfaces Directory

One embodiment of the present invention processes a plurality of source code classes into a plurality of target code classes. The target classes can be divided into two sets: one set derives directly from type definitions and source code in the source classes. The other set appears in the translation interfaces directory, and includes class and interfaces definitions for types which were used but not declared in the source classes. This directory also includes classes which bridge differences in object model between the different platforms, and classes which bridge differences between the source and target platform.

Undeclared Type

The input source files may contain objects of unknown type. This means the objects have types whose definition is not contained in the input source files. Such a type is called an undeclared type. Its definition is not available to the translation method and apparatus of the present invention. These types can be either types defined by the underlying platform or types defined in input source files which were not presented to the translation method and apparatus of the present invention in the current invocation of the translator.

BRIEF DESCRIPTION OF THE DRAWINGS

The foregoing and other objects, aspects, and advantages of the present invention will be better understood and appreciated from the following detailed description of a preferred embodiment with reference to the drawings, in which:

FIG. 12 illustrates detecting in the source code a reference to a service invoked through a primitive type which is not supported on the target platform, causing the translation method of the present invention to generate a bridge class for that primitive type in the translation interfaces directory, where the service not supported on the target platform is defined in the bridge class. (Note that the translator of the invention creates a temporary of the bridge class type in order to invoke the service in the translated source code.)

DETAILED DESCRIPTION OF THE PREFERRED EMBODIMENTS

Figure 1:
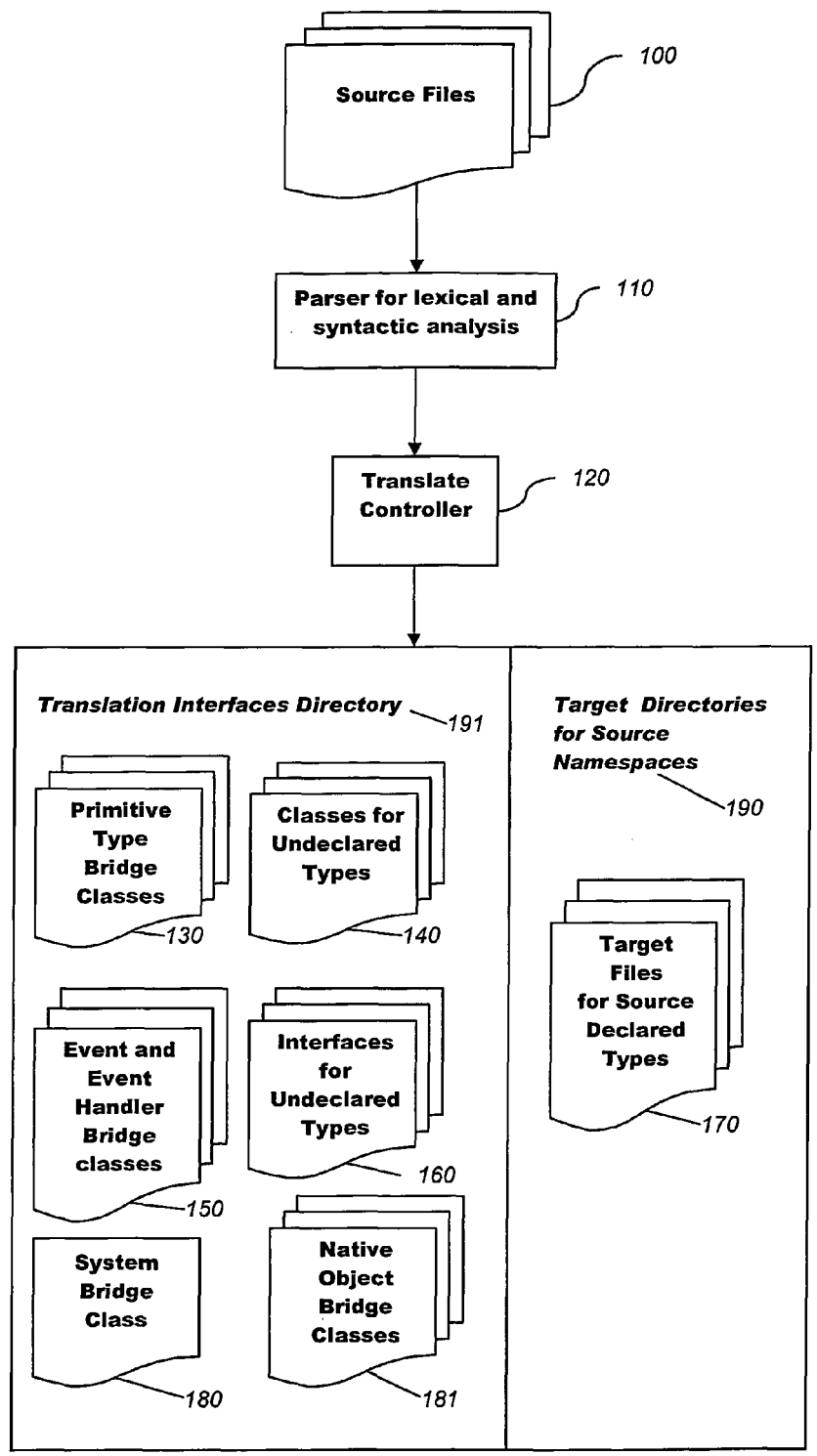
FIG. 1 shows a high level flow chart of one embodiment of the translation method in accordance with the present invention.

With reference to FIG. 1, a flow chart of the method to translate initial source code (100) written in one object oriented language into target source code (170) written in another object oriented language on another platform is shown in accordance with one embodiment of the invention. In a preferred embodiment the initial source code is written in VB.Net and the platform is .Net (products and trademarks of Microsoft Corporation) and the target source code is Java source code and the target platform is the Java platform (products and trademarks of Sun Microsystems Inc.). The first step involves lexical analysis and parsing of the input source files (110) which produces one or more parse trees. This step may be performed utilizing translators and compilers well-known to persons skilled in the art. The translate controller (120) component of the embodiment of the present invention then processes the parse trees for the input source files into target source files (170) contained in target directories corresponding to source namespaces (190) and also produces a translation interfaces directory (191). The translation interfaces directory (191) contains classes of two kinds. The first kind is created as a result of references to user defined types that were not declared in the input source files. As a result of such references, the translation method of the present invention creates classes (140) and interfaces (160). The second kind of class the translation method of the present invention generates in the translation interfaces directory (191) supports bridging the platform differences between the target and the source platform. These classes are called bridge classes. There are four types of bridge classes: primitive type bridge classes (130), system bridge class (180), native object bridge classes (181), and event and event handler bridge classes (150).

Figure 16:
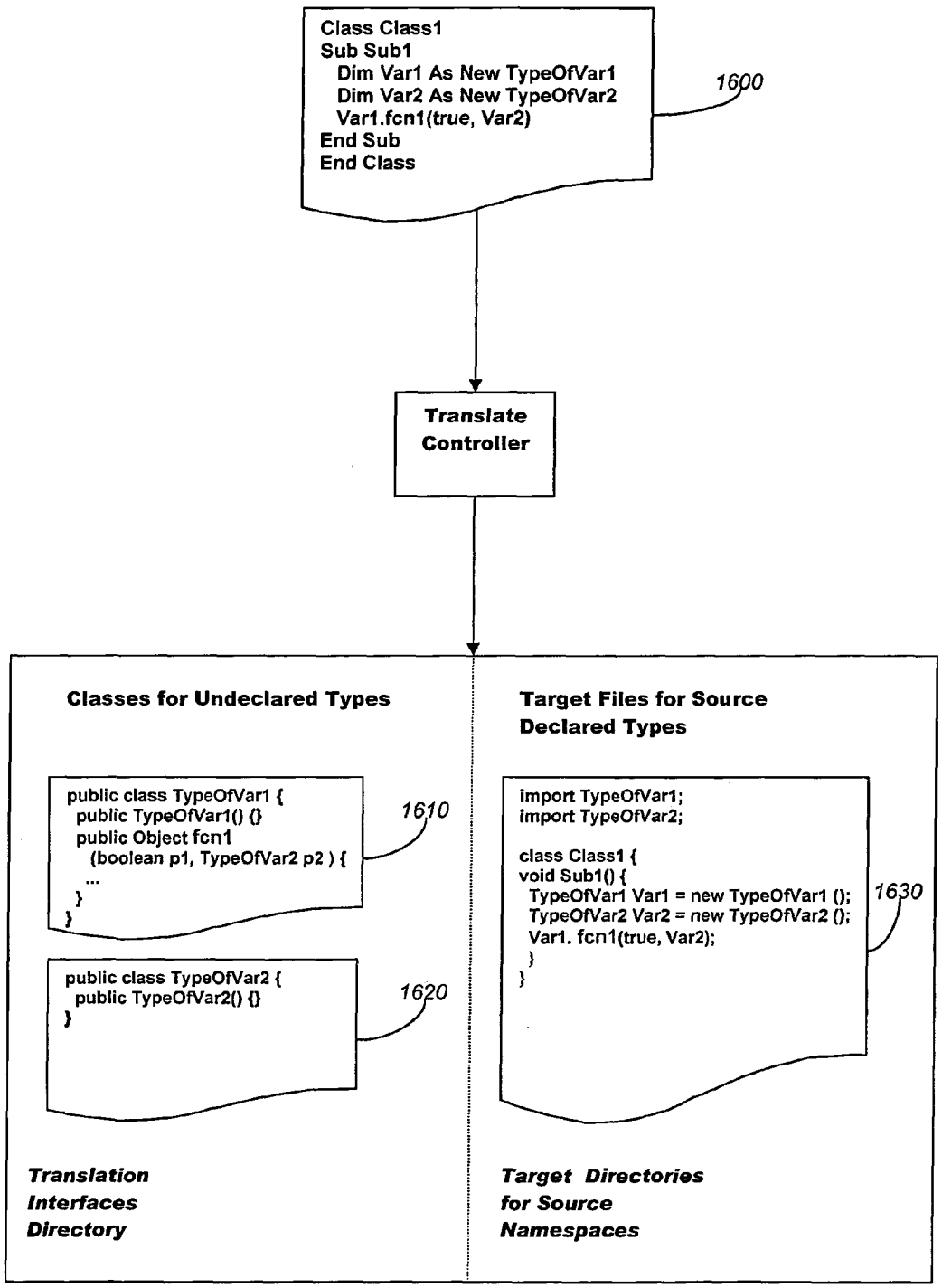
FIG. 16 shows a high level flow chart of one embodiment of the translation method of the present invention for the specific case of translating a reference to two types whose definition is not available in the input source code.

With reference to FIG. 16, an example is shown of one embodiment of the translation method of the present invention translating a source file (1600) that contains a class definition (Class1) and contains references to two classes (TypeOfVar1 and TypeOfVar2) whose definition is not available. The translation method of the present invention generates the translation of Class1 (1630), and, in the translation interfaces directory (191), generates the translation of TypeOfVar1 (1610) and TypeOfVar2 (1620). Note that the signature of fcn1( ) in TypeOfVar1 was obtained through the application of type inference which is implemented in the translation method of the present invention.

Figure 17:
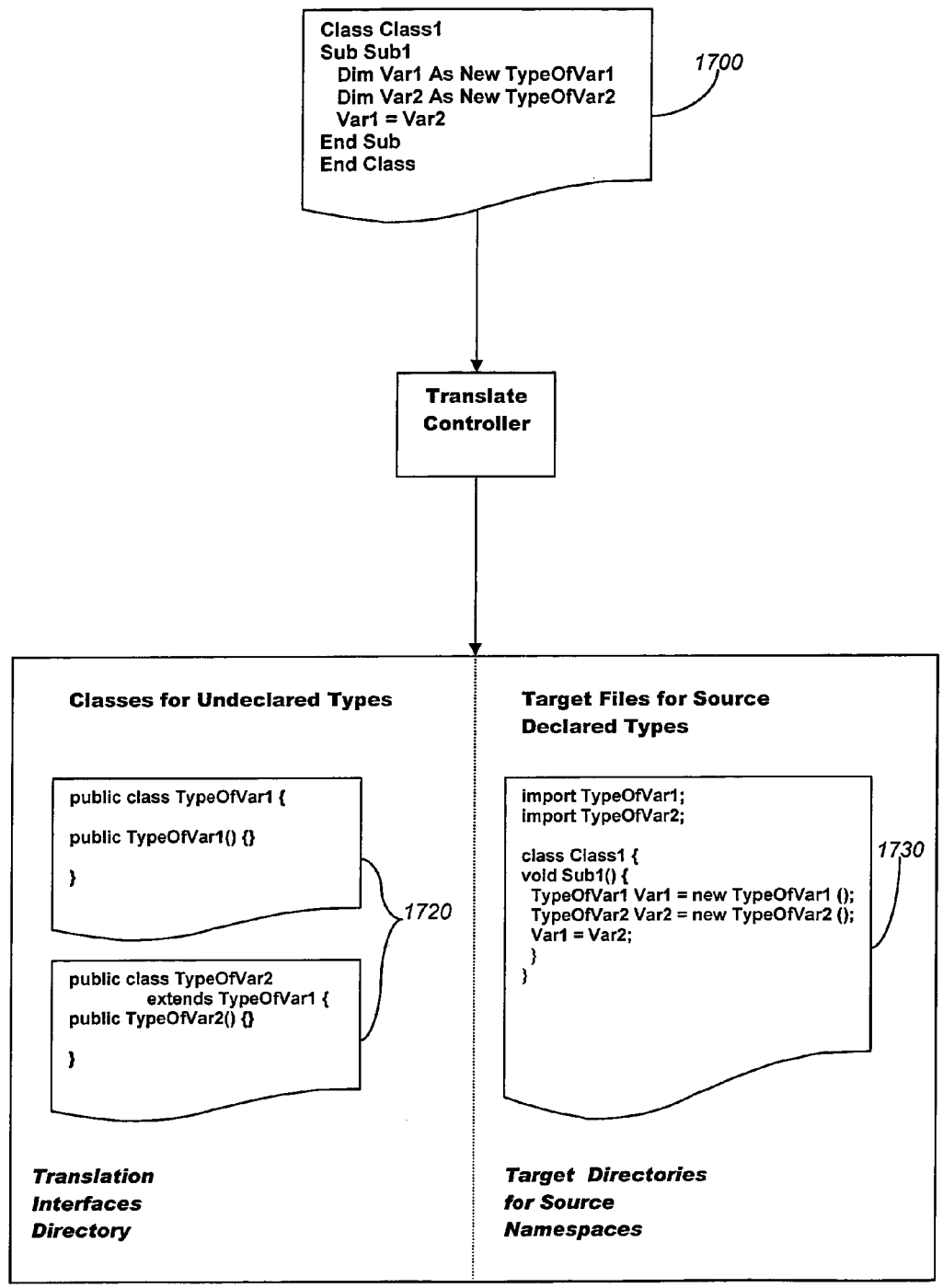
FIG. 17 shows a high level flow chart of one embodiment of the translation method of the present invention for the specific case of translating a reference to two types whose definition is not available in the input source code where those two types have a subtype relationship.

With reference to FIG. 17, an example is shown of one embodiment of the translation method of the present invention translating a source file (1700) that contains a class definition (Class1) and contains references to two classes (TypeOfVar1 and TypeOfVar2) whose definition is not available. The translation method of the present invention generates the translation of Class1 (1730), and, in the translation interfaces directory (191), generates the translation of TypeOfVar1 and TypeOfVar2 (1720). Note that the translation method of the present invention detects a subtyping relationship between the two classes whose definition is not available, TypeOfVar1 and TypeOfVar2. This subtyping relationship is detected because the assignment statement 'Var1=Var2' is valid only if TypeOfVar1 is a supertype of TypeOfVar2.

Figure 13:
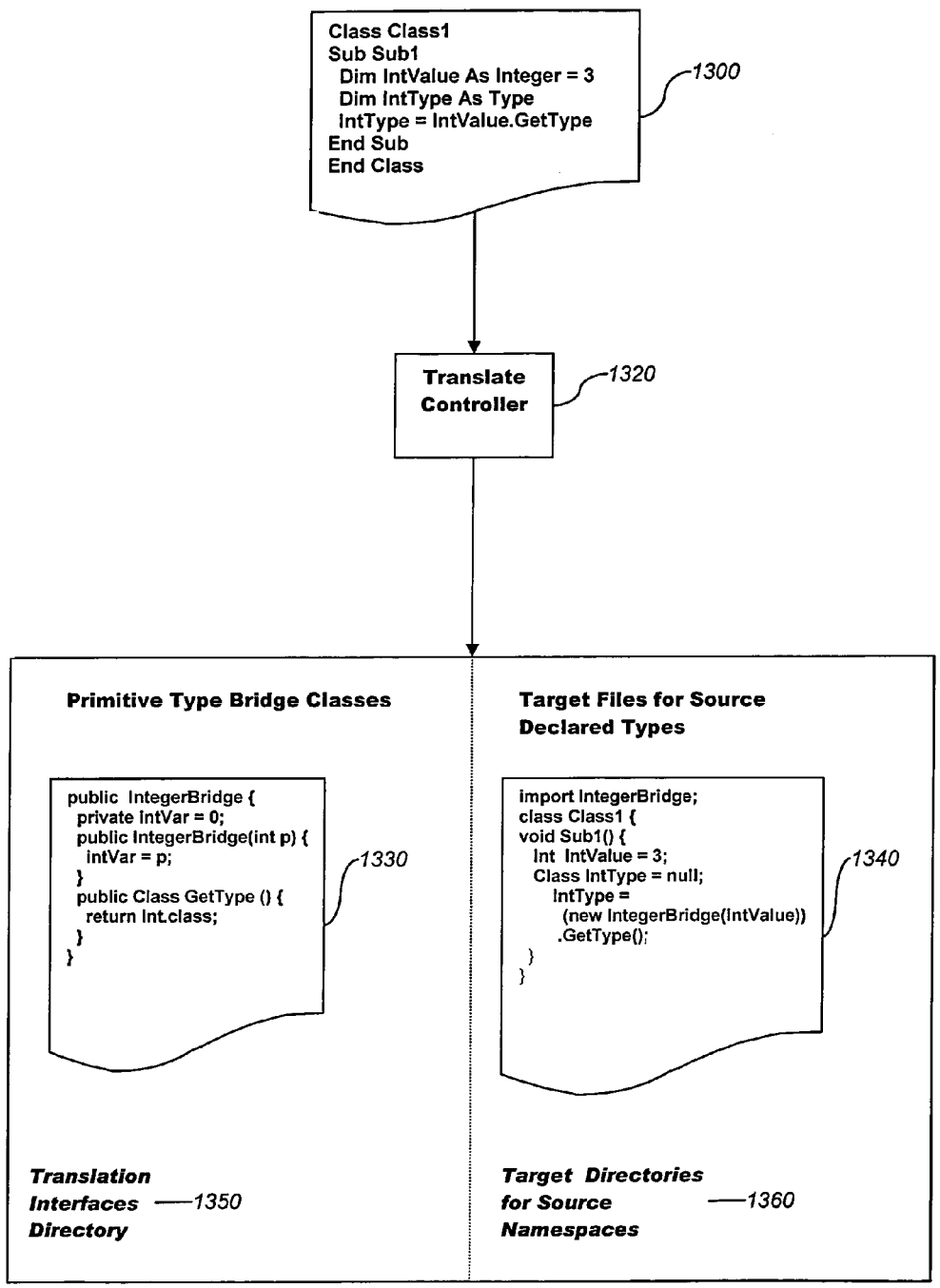
FIG. 13 shows a high level flow chart of one embodiment of the translation method of the present invention for the specific case of translating a reference to a service through a primitive type which is not supported on the target platform employing the underlying example shown in FIG. 12.

With reference to FIG. 13, an example is shown of one embodiment of the translation method of the present invention translating a source file (1300) that contains a class definition (Class1) and the declaration of an integer variable IntValue. The service GetType( ) is invoked through IntValue. Types such as integer, float, Boolean, and the like are termed primitive value types. They are primarily used as simple values rather than as objects with services and defined interfaces. When they are used as simple values, they can be directly translated across platforms. When they are used to invoke services such as GetType( ), platform differences can arise. In this example, the target platform does not support the service GetType( ) invoked through an integer variable. The translation method of the present invention will generate a primitive value bridge type to bridge the platform difference (1330). This generated bridge type will support the requested service; for this case it returns the value of Java's 'int.class'. In the translated expression, an instance of the bridge type is created as a temporary with the value of the integer variable as the parameter to its constructor (1340).

With reference to FIG. 12, in one embodiment of the translation method of the present invention, objects of primitive value bridge type have the following characteristics (1250):
 1. They are temporaries, created with the primitive value.
 2. They are created only when needed.
 3. The application of type inference which is implemented in the translation method of the present invention will create any needed services, with appropriate signatures, for the primitive value bridge type.
 4. They function as object wrappers for the underlying primitive value.

Figure 14:
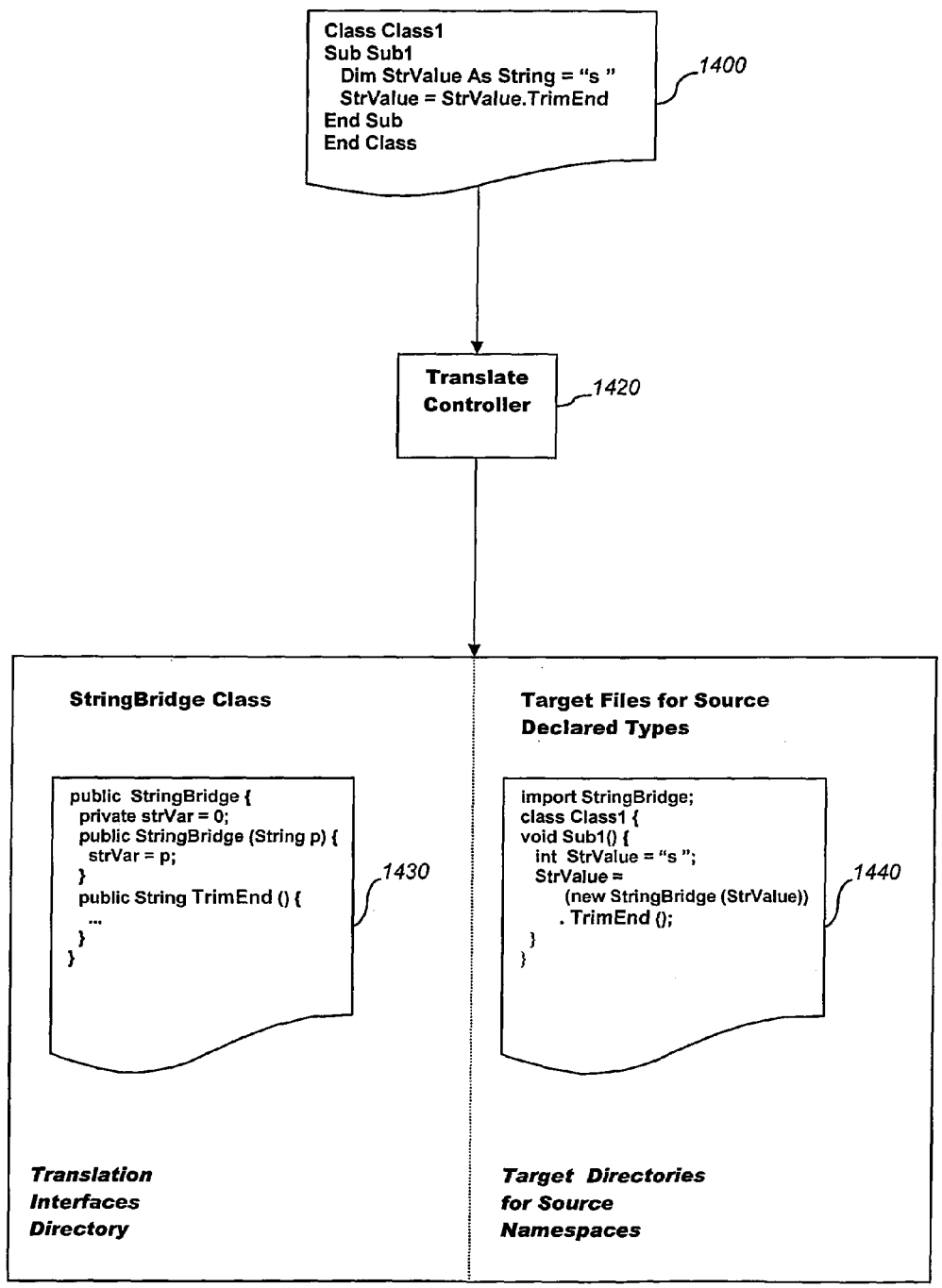
FIG. 14 shows a high level flow chart of one embodiment of the translation method of the present invention for the specific case of translating an invocation of service through a native object where the native object on the target platform does not support that service.

FIG. 14 shows an example of a preferred embodiment of the translation method of the present invention translating a source file (1400) that contains a class definition (Class1) and the declaration of an string variable StrValue. The service TrimEnd( ) is invoked through StrValue. Types such as String and Object are termed native object types. They are objects with services and defined interfaces that implement functionality fundamental to the object oriented language. Many services for native object types are defined identically across the platforms, but when the service definitions are not identical, platform differences must be dealt with. In this example, the target platform does not support the service TrimEnd( ) invoked through a string variable. The translation method of the present invention will generate a native object bridge type to bridge the platform difference (1430). This generated bridge type will contain an interface for the requested service. In the translated expression, an instance of the bridge type is created as a temporary with the value of the string variable as the parameter to its constructor (1440).

Figure 15:
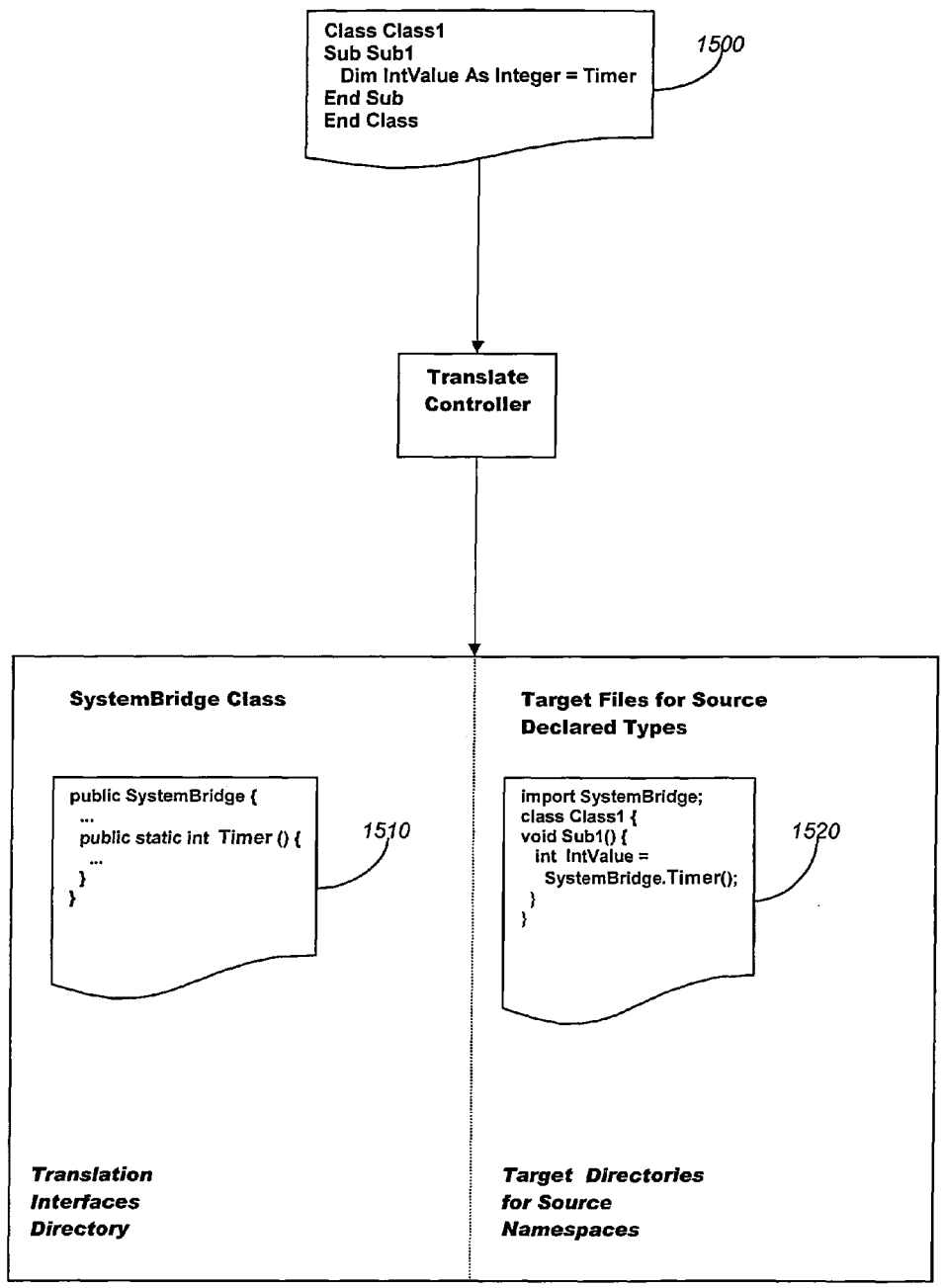
FIG. 15 shows a high level flow chart of one embodiment of the translation method of the present invention for the specific case of translating a reference to a platform service which is not supported on the target platform.

FIG. 15 shows an example of a preferred embodiment of the translation method of the present invention translating a source file (1500) that contains a class definition (Class1) and the declaration of an integer variable IntValue which is initialized to the return value of a system function Timer( ). This function, invoked in this specific fashion, is supported by the source platform, but it is not available in this specific fashion on the target platform. This is an example of platform differences which can arise in whether and how platforms support certain functionality. In this example, the target platform does not support the service Timer( ) invoked in this specific fashion. The translation method of the present invention will generate a system bridge class to bridge the platform difference (1510). This generated system bridge class will contain an interface to the requested service and it is this stub, accessed as a static function, which is invoked in the target source code (1520).

Figure 18:
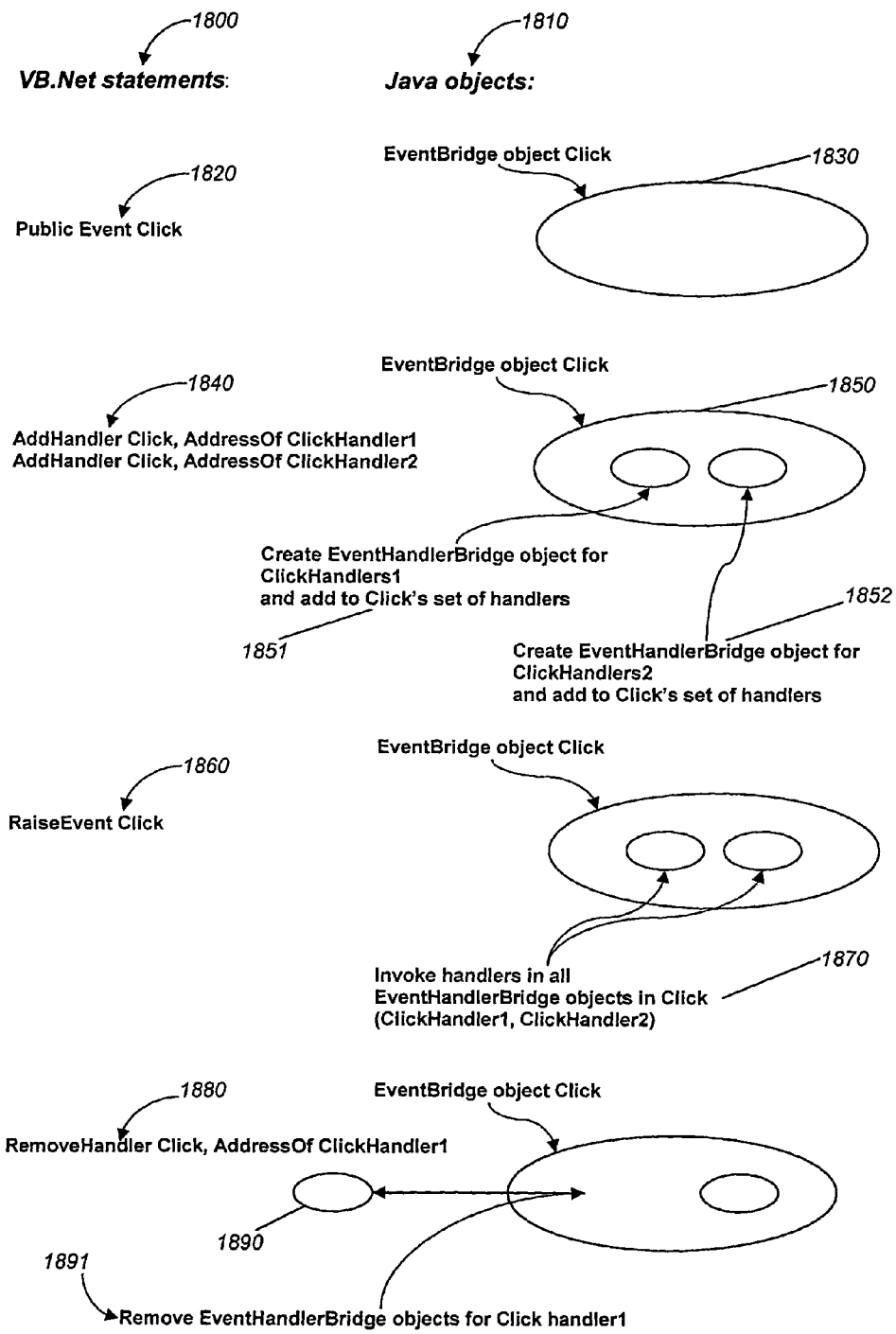
FIG. 18 shows a high level flow chart of one embodiment of the translation method of the present invention for the specific case of translating Events, Event handlers, and related statements in VB.Net to use the EventBridge and EventHandlerBridge classes in the translated code.

FIG. 18 shows an example of mapping VB.Net Event declarations and statements into a translated implementation using EventBridge and EventHandlerBridge classes (1800, 1810), which are defined and generated by the preferred embodiment of the translation method of the present invention. The Java Bridge classes EventBridge and EventHandlerBridge wrap the built-in Event and event handler syntax in VB.Net, and their interfaces support the needed functionality.

In general, the Bridge class EventBridge encapsulates the functionality to support VB.Net Events, and the Bridge class EventHandlerBridge encapsulates the functionality to support VB.Net event handlers. Each EventHandlerBridge object contains one handler and the information needed to invoke that handler when the Event is raised.

The VB.Net syntax for Events and event handling is translated into calls to services provided by the classes EventBridge and EventHandlerBridge. FIG. 18 shows the declaration of an Event Click in VB.Net (1820) and the corresponding creation of an EventBridge object Click in the translated Java (1830). For every VB.Net Event object, in the translated code there is an EventBridge object.

FIG. 18. shows the EventBridgeHandler object for ClickHandler1 created and added to the Click EventBridge object (1851). The VB.Net statements to add handlers to the Event is shown in (1840), and the corresponding Click EventBridge object with two EventHandlerBridge objects added to it is shown in (1851, 1852). Adding a handler to an Event in VB.Net translates into invoking services in the EventBridge class to add an EventHandlerBridge object to the set of handlers in that EventBridge object.

FIG. 18 shows the VB.Net statement to remove the handler ClickHandler1 from the Event Click (1880). The corresponding removal of the ClickHandler1 EventHandlerBridge object from the Click EventBridge object is also shown (1890, 1891).

Figure 2:
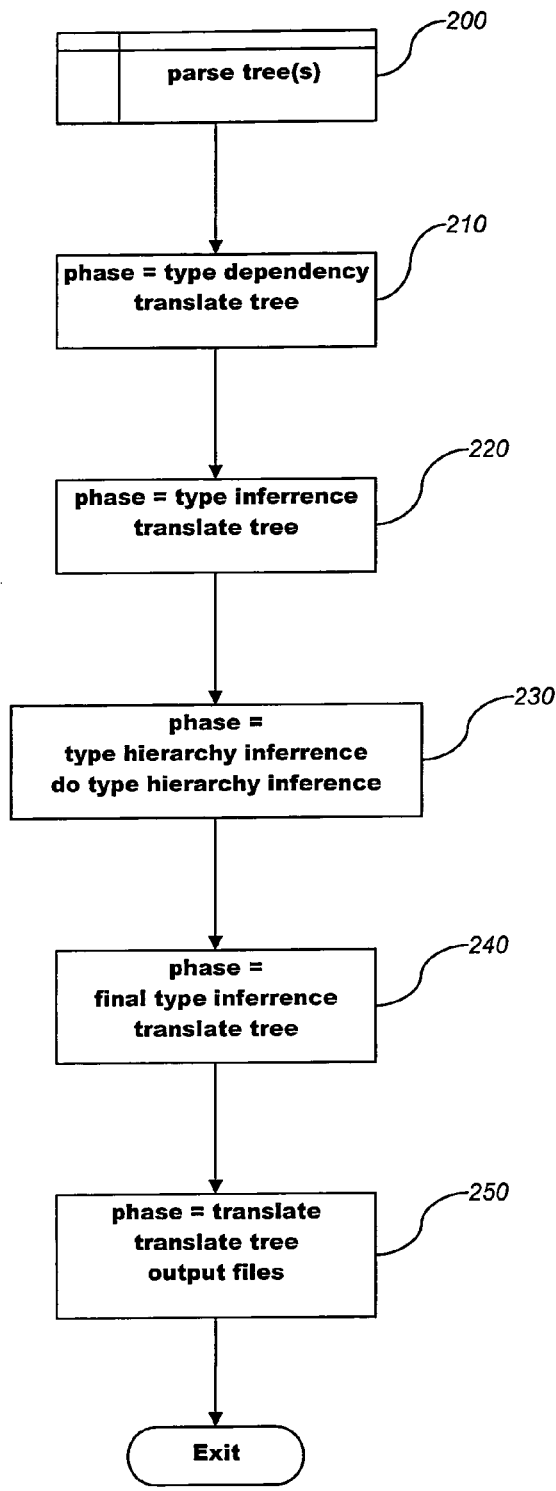
FIG. 2 shows a high level flow chart of the translate controller component of the present invention, which accepts a parse tree as input and processes it through the phases of type dependency analysis, type inference analysis, type hierarchy analysis, and output.

Referring again to FIG. 1, the translate controller (120) is shown with the details of its phases and flow of control in FIG. 2, in accordance with one embodiment of the translation method of the present invention. The input to the translate controller (120) is the parse tree(s) created from the input source code (200). The translate controller (120) performs several phases of analysis before translation of the source code into the target code takes place. In the type dependency and type inference phases, the input parse trees are traversed. What information is collected during the traversal and what actions are taken as a result of that information varies with the phase.

The first phase is type dependency analysis (210). In this phase, objects of unknown type which share a type are put into the same set, called an unknown type set. An object has unknown type if it is undeclared. An example of such an object is shown in FIG. 15, where system function Timer( ) is used to initialize a variable (1500). In this example nothing is known about system function Timer( ) by the translation method of the present invention: it is undeclared and its return type is unknown.

The following code is the same as the code in the example shown in FIG. 15 except line 4 and line 5 have been added to further illustrate the calculation of the unknown type set.

EXAMPLE 1

```
1 Class Class1
2
3 Sub Sub1
4     Dim Obj1 As New UndeclaredType1
5     Obj1.function1(Timer( ))
6     Dim IntValue As Integer = Timer( )
7 End Sub
8 End Class
```

In this example, function1 is an undeclared function because the definition of the class which contains the function, UndeclaredType1, is not available in the source which is input to the translation method. Thus the signature of function1 is unknown. Line 5: 'Obj1.function1(Timer( ))' has the effect of putting the parameter to function1 into the same unknown type set as the return type of Timer( ). That is, the parameter to function1 and the return type of Timer( ) are in the same unknown type set.

Figure 7:
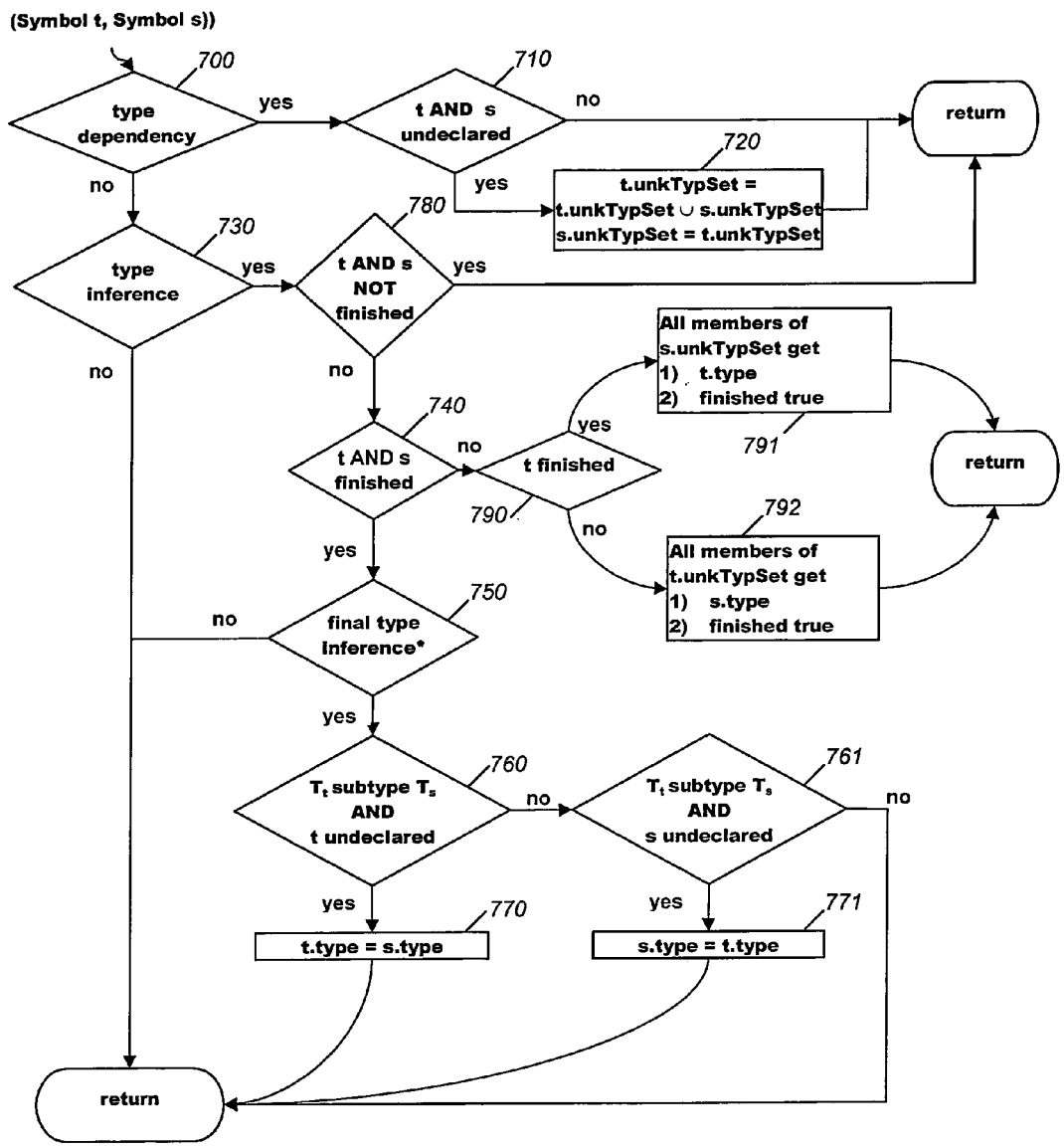
FIG. 7 shows a flow chart of steps of the translation method of the present invention performing type inference analysis both in the type dependency phase and in the type inference phase.

In one embodiment of the translation method of the present invention, the translate controller (120) controls the setting of the phase. During the type dependency phase of the translate controller of the invention (210), the unknown type sets are constructed for all objects of unknown type. For one embodiment of the translation method of the present invention, calculation of the unknown type set is shown in FIG. 7, which shows type inference calculations for all type inference phases. The 'type inference controller' first checks the type inference phase, and if the phase is type dependency (700) and both type inference operands are undeclared (710), then the 'type inference controller' calculates the unknown type set and exits (720). In the current example, the first parameter to function1 and the return type of Timer( ) are both undeclared (710) and therefore will be inserted into the same unknown type set (720).

With reference to FIG. 2, in one embodiment of the translation method of the present invention there is a second phase of analysis, type inference analysis, which is shown (220). In this phase, the types of undeclared objects are inferred from their use in assignments and calls. Also, inferred types are propagated to objects of unknown type which are in the same unknown type set. In Example 1, Line 6 shows that an integer variable is initialized to the return type of Timer( ). In the type inference phase, this causes the return type of Timer( ) to be inferred to be integer. Because the return type of Timer( ) is in the same unknown type set as the parameter to function1, during the type inference phase the parameter to function1 also gets the inferred type of integer.

With reference to FIG. 2, in one embodiment of the translation method of the present invention there is a third phase of analysis, type hierarchy inference analysis, which is shown (230). In this phase, a hierarchy for undeclared types is inferred from the uses of objects which are declared to have those types. FIG. 17 shows an example of the translator of the translation method of the present invention translating a source file (1700) that contains a class definition (Class1) and contains references to two classes (TypeOfVar1 and TypeOf- Var2) whose definition is not available. During type hierarchy inference analysis, the translation method of the present invention detects a subtyping relationship between the two classes, TypeOfVar1 and TypeOfVar2 (1720). This subtyping relationship is detected because the assignment statement 'Var1=Var2' is valid only if TypeOfVar1 is a supertype of TypeOfVar2. Every type, declared and undeclared in the input source files, has associated with it a set of super types, collected by the translation method of the present invention, where, for a type T, every member of T's supertype set has T as a subtype. During type hierarchy inference, the translation method of the present invention uses the supertype sets to construct a hierarchy for undeclared types referenced in the input source files.

With reference to FIG. 2, in one embodiment of the translation method of the present invention there is a fourth phase of analysis, final type inference analysis, which is shown (240). This phase is the same as the second phase, also a type inference phase (220), discussed above, except this phase takes place after type hierarchy inference analysis (230). This phase (240) supports more precise type inference in the case that the types are related in a hierarchy. If an undeclared object can have one of two types (such as 'Derived' and 'Base', where the first is a subtype of the latter), then if the undeclared object is a source, it should get the subtype of the pair ('Derived'), but if the undeclared object is a target, it should get the supertype of the pair ('Base'). This will be described in more detail later.

With reference to FIG. 2, in one embodiment of the translation method of the present invention there is a final phase, the translate and output phase, which is shown (250) During this phase the parse tree is translated into the target language and all the output files are written to the appropriate directories.

Figure 3:
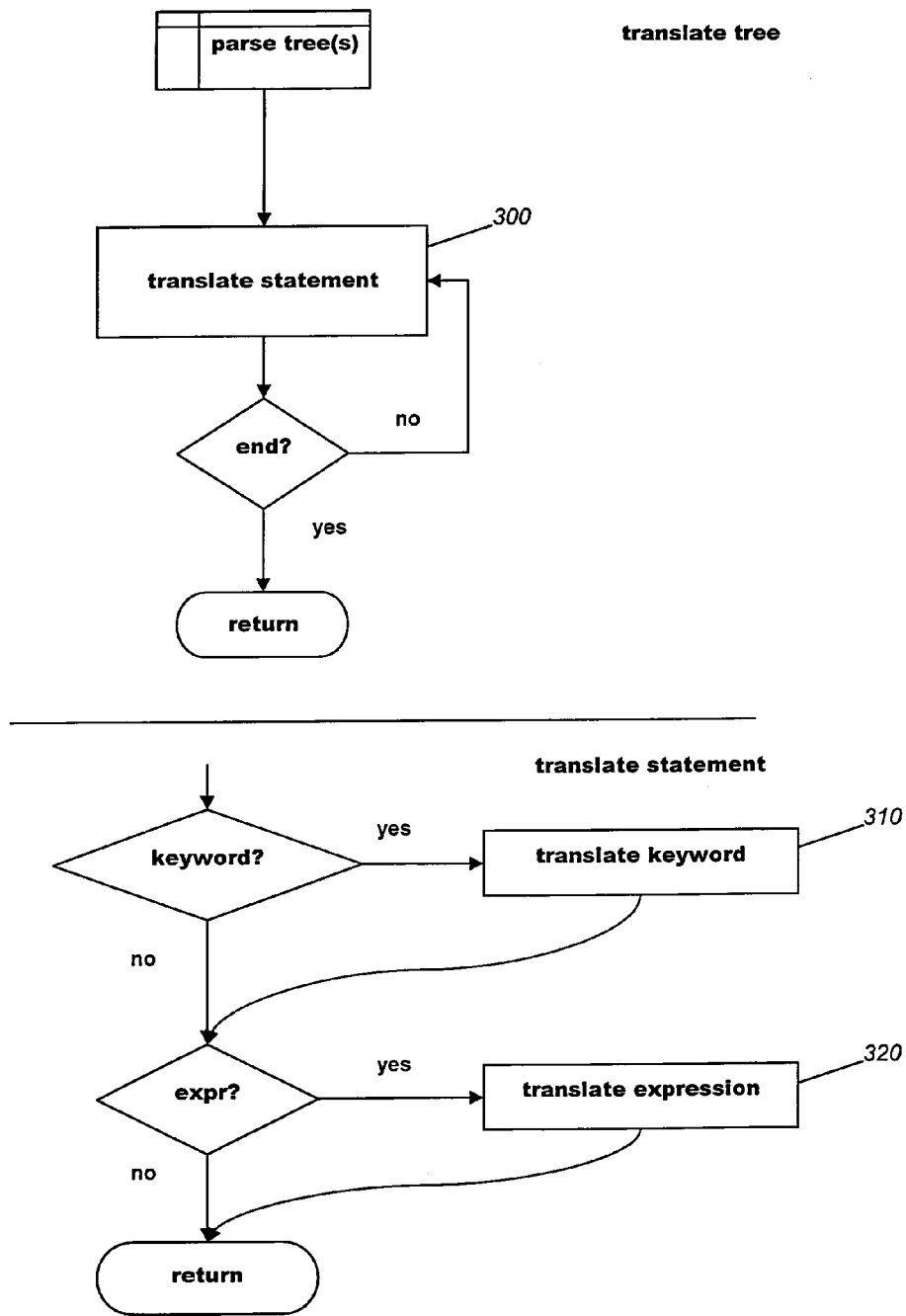
FIG. 3 shows a flow chart of steps of the translation method of the present invention as it processes specific statements of the original source language.

With reference to FIG. 2, in one embodiment of the translation method of the present invention there is an action 'translate tree' shown at (210, 220, 240, 250). FIG. 3 provides a high level flow chart of the steps involved in 'translate tree'. FIG. 3 shows that the translation method of the present invention traverses the parse tree(s), recognizing subtrees which are statements and translating keywords and expressions. The implementation of this aspect of the translation method of the present invention is well-known to persons skilled in the art. This traverse is performed in multiple phases but it is only in the final phase that output is generated.

Figure 4:
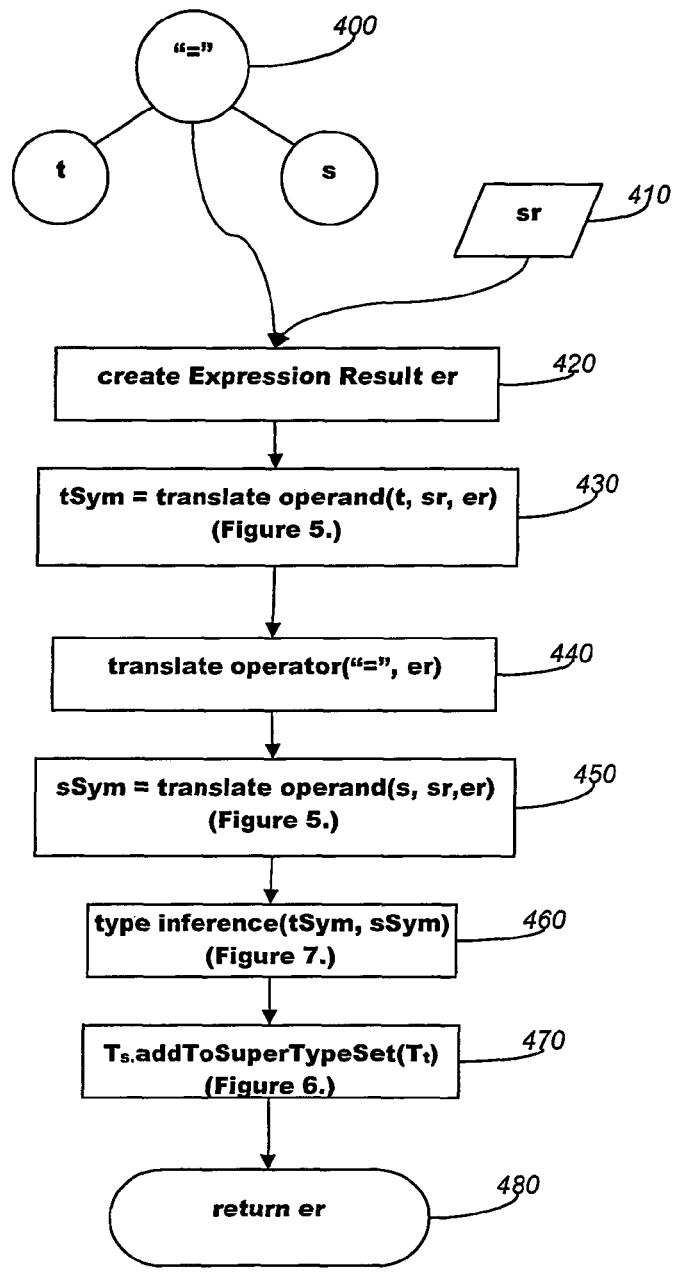
FIG. 4 shows a flow chart of steps of the translation method of the present invention analyzing an expression subtree in the parse tree, where calculations are performed related to subtyping (via the supertype set) and type inference.

With reference to FIG. 4, a flow chart shows the analysis of one embodiment of the translation method of the present invention as performed during execution of 'translate expression'. This is where the translation method of the present invention traverses expression subtrees, and also this is where the translation method of the present invention gathers and analyzes information during the type dependency and type inference phases. The specific example shown in FIG. 4 illustrates the first parameter to 'translate expression' to be an assignment expression subtree where the root of the subtree contains the operator and the subtrees of that root are the operands (400). This is an example of one type of expression subtree which can be input to 'translate expression'. Other types of subtrees which can be input to 'translate expression' include, but are not limited to, call expressions, logical expressions, shift expressions, etc. Note that the operands, 't' and 's' for target and source, respectively, may be declared or undeclared, and the types of these operands, '$T_t$' and '$T_s$', may be declared or undeclared. The second parameter is the scope of reference, used during symbol table lookups, to find the symbol entry in the symbol table for a name (410). This routine returns the translated expression in an expression result 'er' (480).

In one embodiment of the translation method of the present invention the analysis of the expression is performed through three steps. The first step is the translation of each operand (430, 450). The second step is the call to the 'type inference controller' (460). The third step is the calculation of the supertype set (470). Each of these steps of the analysis of the translator of the invention will be presented in detail.

Figure 5:
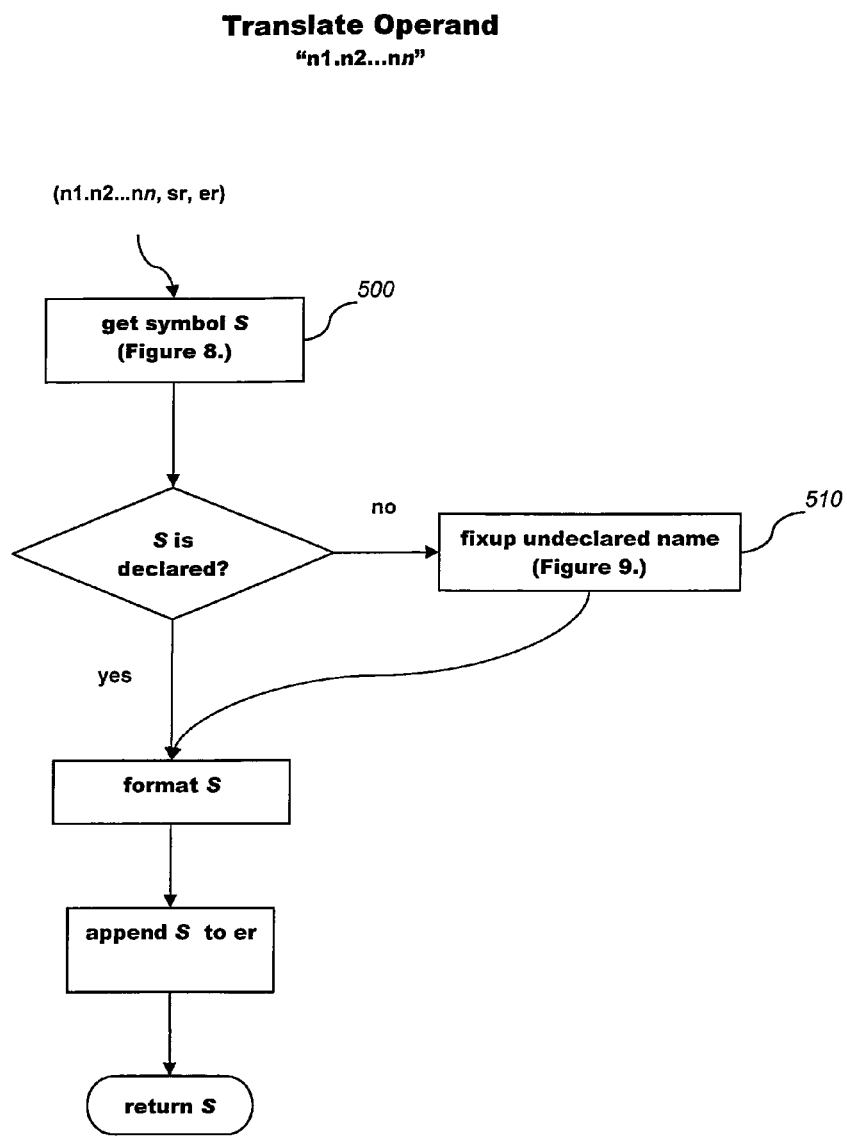
FIG. 5 shows a flow chart of steps of the translation method of the present invention translating a specific operand which requires fetching the Symbol for the operand from the symbol table and, if it is an undeclared name, identifying its kind from its usage.

In one embodiment the first step in the analysis of the expression by the translation method of the present invention is the translation of each operand (430, 450). FIG. 5 shows how 'translate operand' first calls 'get symbol' for the operand (500) and then performs any needed fixups (510).

Figure 8:
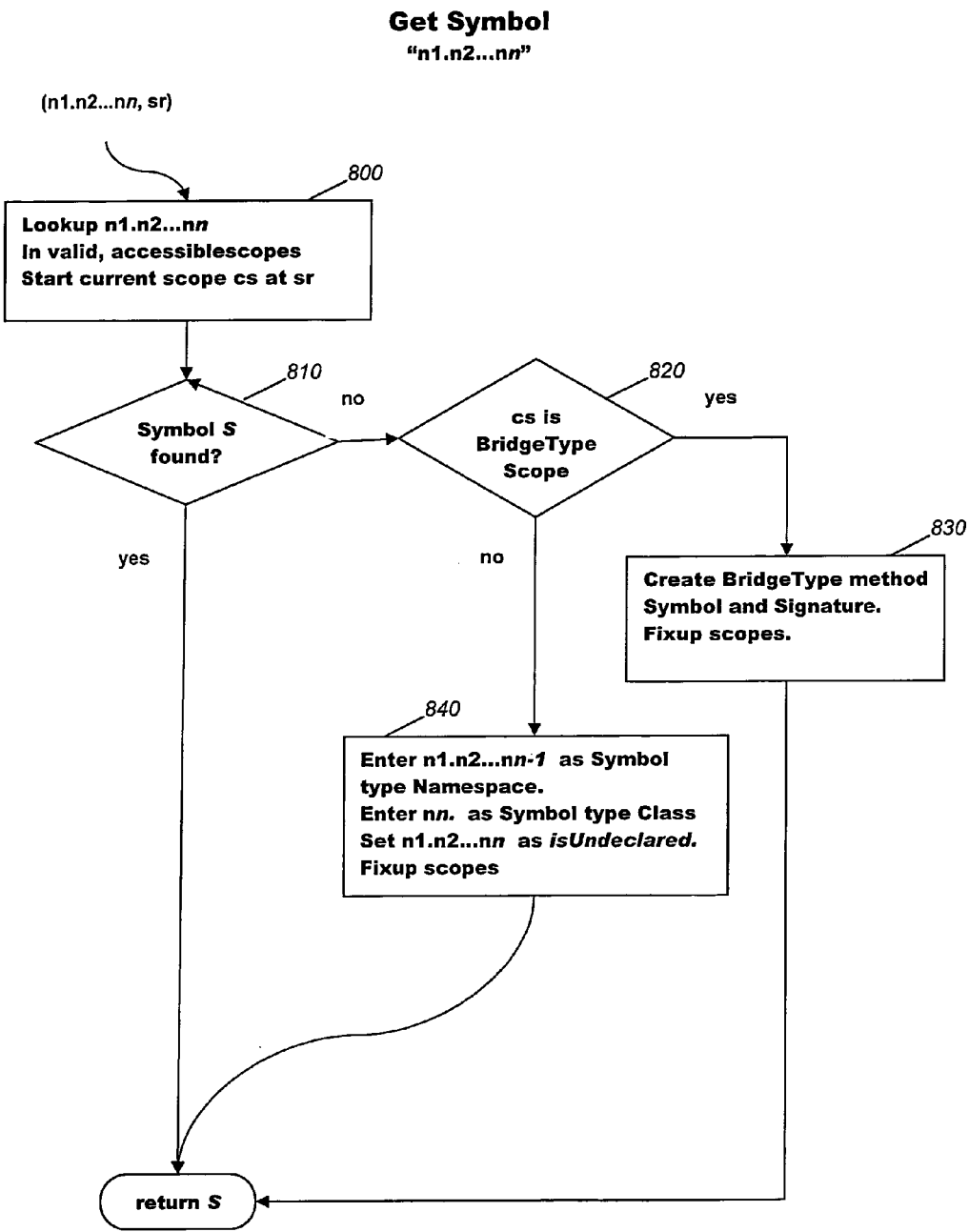
FIG. 8 shows a flow chart of steps of the translation method of the present invention getting the Symbol for a name from the symbol table, where new Symbols are created for names whose definition was not explicit in the input source program.

FIG. 8 shows the details of 'get symbol' for one embodiment of the translation method of the present invention. This routine returns the symbol for names which are declared, and creates and returns symbols for names which are undeclared. (In this embodiment, names which are declared have symbol entries created for them during the phase of parsing and lexical analysis. Names which are undeclared will have symbol entries created for them during this step.) First the name is looked up in the symbol table, starting with the scope of reference (800) and checking all valid accessible scopes. If a symbol is found for this name, it is returned (810). If no symbol is found, one is created (830, 840) and returned.

In accordance with one embodiment of the translation method of the present invention, a symbol for an undeclared name can be created by 'get symbol' in two ways. In the first way, if the final scope checked for the undeclared name is for a scope for a primitive type (such as integer, Boolean, etc.) (820), then the undeclared name is the name of a bridge type method (830). For one embodiment shown in FIG. 12, the input source invokes a method 'GetType' on an integer variable 'IntValue', where the method is not supported on the target platform (1210). Because the invoking object is an integer variable, the scope checked for the undeclared name 'GetType' is the scope of the primitive type integer. This is the trigger for 'get symbol' to create a symbol for 'GetType' in the scope of IntegerBridge (1220). The resulting code on the target platform invokes the method 'GetType' on an IntegerBridge (1240).

Referring again to FIG. 8, in accordance with one embodiment of the translation method of the present invention, the second way a symbol for an undeclared name can be created in 'get symbol' is through the creation of namespaces and classes for the name (840). If a name 'N1' is unqualified, a symbol and scope for class 'N1' is created and returned. If the name has qualifiers 'N1.N2.N3', then the leading qualifiers cause the creation of symbols and scopes for namespaces ('N1' and 'N2') and the final qualifier causes the creation of a symbol and a scope for a class ('N3'). In this case, the symbol for the final qualifier 'N3' is the one which is returned (840).

Thus, in one embodiment of the translation method of the present invention, 'get symbol' will create symbols for undeclared names. Either a symbol for a bridge type method or a symbol for a class will be created by 'get symbol' for an undeclared name and returned to 'translate operand'. In one embodiment of the translation method of the present invention, 'translate operand' may have to perform a fixup on the returned symbol. Undeclared names can have a variety of kinds. The undeclared name may be the name of a class, interface, method, getter or setter property, or default property. But the symbol returned by 'translate operand' will be the symbol for a class or bridge type method. Therefore, in one embodiment, 'translate operand' calls 'fixup undeclared name' (510) shown in FIG. 5 to insure that the symbol kind matches its use.

Figure 9:
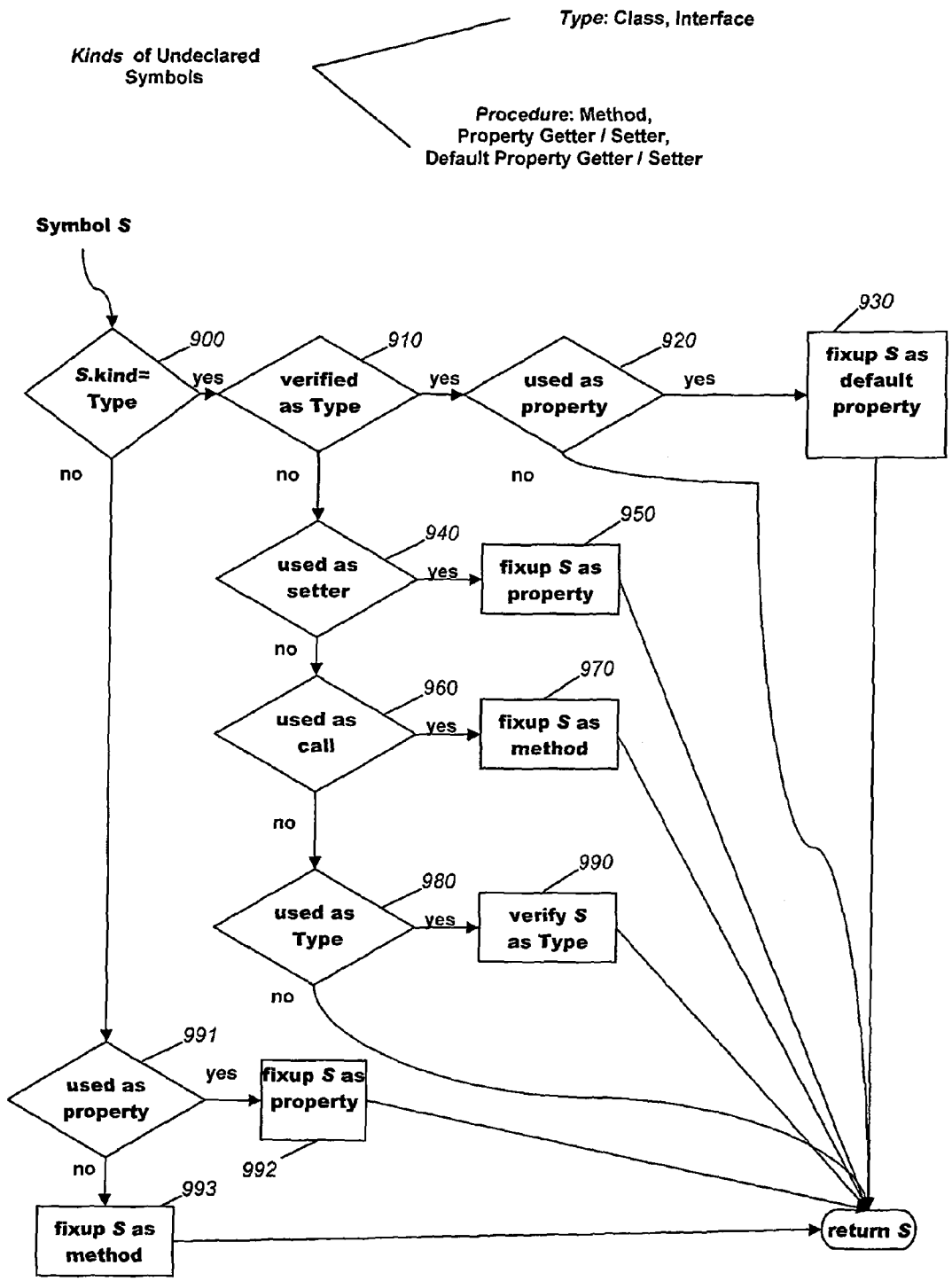
FIG. 9 shows a flow chart of steps of the translation method of the present invention analyzing the usage of a name whose definition is not available in the input source code and from that usage, inferring what kind of Symbol it is.

FIG. 9 shows, for one embodiment of the translation method of the present invention, how 'fixup undeclared name' fixes up symbols so that the symbol kind accurately reflects the symbol usage. Note that the symbol kind can change over the course of translation as a result of more information about the symbol usage being analyzed by the translation method of the present invention. In one embodiment, an undeclared symbol will start out as a class by default. Depending on usage, it can remain a class, or become an interface, method, property, or default property.

EXAMPLE 2

```
1 Class Class1
2  Sub Main
3      Name1.method1
4      Name2.item1 = Name1.method1
5      Dim Name3 As Object = Name4.Name5.Name6
6      Dim Name7 As Object = new Name8
7  End Sub
8 End Class
```

All of the names in Example 2 except Name3 and Name7 are undeclared. In one embodiment of translation method the present invention, 'fixup undeclared name' determines valid kinds for the undeclared names. Specifically, it determines that Name1 is a class name (980), method1 is a method name (970), Name2 is a class name (980), item1 is a setter name (940), Name4 is a namespace, Name5 is a class (980), Name6 is a method (970), and Name8 is a class (990). (Note that FIG. 9 does not break out the identification of namespaces, as namespaces are encountered as part of type names, and their processing is folded into the processing of type names.) The translation method of the present invention will generate the source code for classes Name1, Name2, Name4.Name5, and Name8, into the translation interfaces directory (191). In one embodiment, the final generated output code for Class1 will appear as follows:

EXAMPLE 3

```
1 class Class1 {
2      public static void main(String[ ] args) {
3          Name1.method1( );
4          Name2.set_item1(Name1.method1( ));
5          Object Name3 = Name4.Name5.Name6( );
6          Object Name7 = new Name8   ( );
7      }
8 }
```

Recall that the analysis of the expression by one embodiment of the translation method of the present invention is performed through three steps, where the first step is the translation of each operand (430, 450). The preceding discussion details the first step. The preceding discussion has shown how 'translate operand' first calls 'get symbol' for the operand (500) and then does any needed fixups (510). After any needed fixups have been performed, 'translate operand' formats the operand into the expression result and returns the symbol for the operand. Now the presentation of the first step of expression analysis for one embodiment of the translation method of the present invention, operand translation, is complete.

Referring again to FIG. 4, for one embodiment of the translation method of the present invention the second step in the analysis of the expression is the call to the 'type inference controller' (460). The 'type inference controller' will perform type inference analysis on the input source parse tree(s). As a result of type inference analysis, members of classes whose definitions are not available in the input source code have their types and signatures inferred from their use, and inferred types are propagated to any objects of unknown type which share the inferred type.

Referring again to FIG. 2, recall that in one embodiment of the translation method of the present invention 'translate expression' is called during the type dependency phase (210), the type inference phase (220), and the final type inference phase (240). The call to the 'type inference controller' happens in 'translate expression' (460) shown in FIG. 4, and thus the 'type inference controller' is invoked in each of those phases. Its specific actions depend upon the phase in which it is invoked.

In one embodiment of the translation method of the present invention, inputs to the 'type inference controller' are two symbols, a source and a target, which arise from specific contexts in expressions present in the input source code. For example, in an assignment, the right hand side is the source and the left hand side is the target, whereas in a method invocation, the actual parameter is the source and the formal parameter is the target.

FIG. 7 shows the type inference calculations in detail. During the type dependency phase of the translate controller (120), the 'type inference controller' constructs the unknown type sets for all objects of unknown type. In FIG. 7, the 'type inference controller' first checks the type inference phase, and if the phase is type dependency (700) and both type inference operands are undeclared (710), then the 'type inference controller' calculates the unknown type set and exits (720).

In accordance with one preferred embodiment, during the type inference phase (730) of the translate controller (120), the 'type inference controller' performs the checks and updating of type inference. Some of these checks involve the symbol status 'finished'. A symbol can have the status 'finished' if it is declared (in this case it is always 'finished' because its type will never change as a result of type inference) and it can also have the status 'finished' if it is undeclared but it has already had a type assigned to it through type inference.

The pair of symbols input to the 'type inference controller' can either (1) both be unfinished, (2) one be finished and one be unfinished, or (3) both be finished. If case (1), that is, in the case that neither is 'finished' (780), it means that each symbol is undeclared and neither has had a type inferred. Therefore, there is nothing to infer, and so the 'type inference controller' is exited without any type inference occurring.

If case (2), that is, in the case that one symbol is 'finished' and one is not (790), the symbol which is not 'finished' gets the type of the symbol which is 'finished'. All members of its unknown type set also get the new type, and all the updated symbols are marked 'finished' (791, 792). Then the 'type inference controller' exits.

If case (3), that is, in the case that both input symbols are 'finished' (740) and this is not the final type inference phase, there is no further type inference to do for these symbols at this time and the 'type inference controller' exits (750). If this is the final type inference phase, that means that type hierarchy inference has been completed (230) as shown in FIG. 2, and there is a type hierarchy for undeclared types that can be used to refine the type inference and make the results more precise.

FIG. 16 shows an undeclared function 'fcn1' whose signature is inferred by the 'type inference controller'. The invocation is shown as part of the input source code (1600) and the inferred signature (inferred from the actual parameter types) is shown as part of the output target code (1610).

Recall that the analysis of the expression by one embodiment of the translation method of the present invention is performed through three steps, where the second step is the call to the 'type inference controller' (460) shown in FIG. 4. The preceding discussion details the second step. For now the presentation of the second step of expression analysis, the call to the 'type inference controller', is complete. Note that there will be some additional detail on the final type inference phase of the second step following the presentation of the third step.

In one embodiment of the translation method of the present invention, the third step in the analysis of the expression is the calculation of the supertype set (470). Supertype sets are calculated in the type dependency and type inference phases, and this information is then used, during the type hierarchy inference phase, to infer type hierarchies for the translated code. These type hierarchies will be output into the translation interfaces directory during the translate phase.

Figure 6:
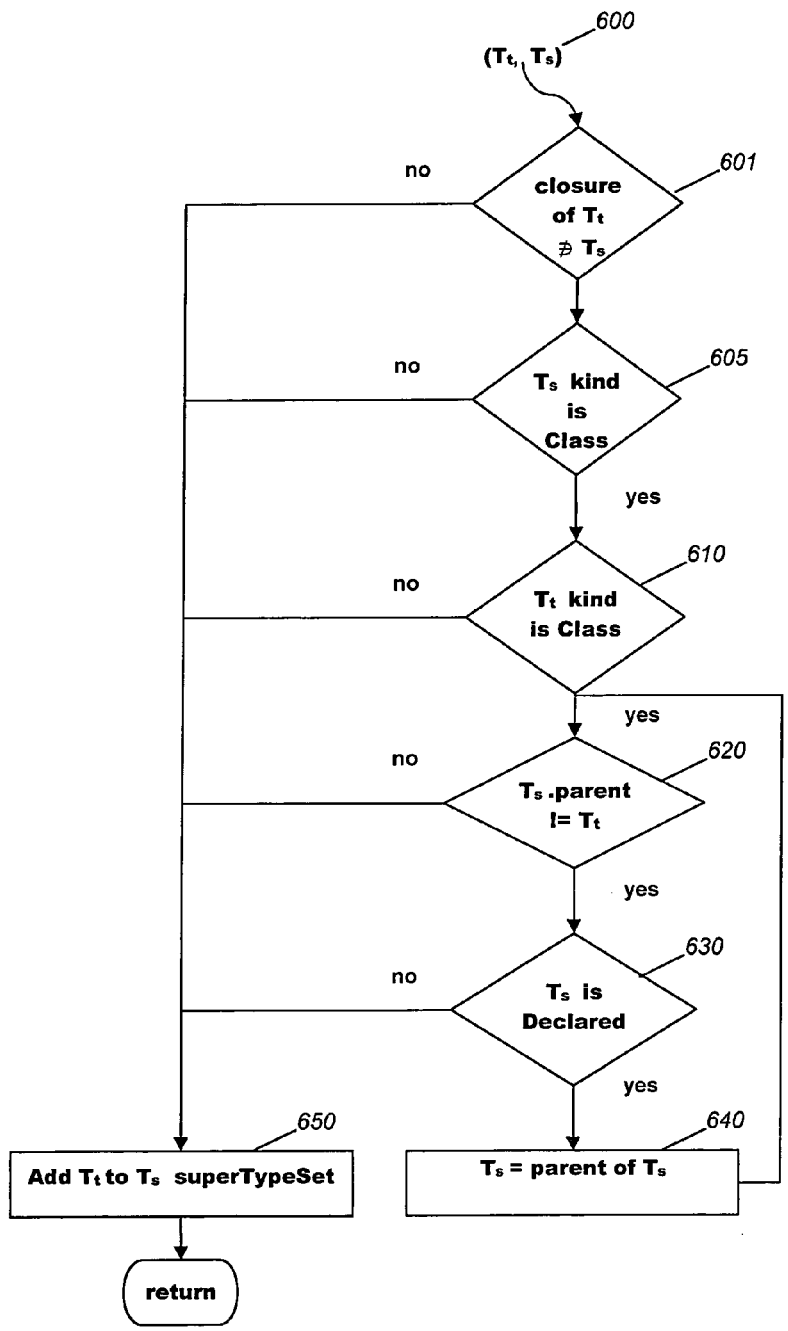
FIG. 6 shows a flow chart of steps of the translation method of the present invention analyzing the types of the source and target operands in an expression and recording the inferred subtyping relationship in the supertype set.

For one embodiment, FIG. 6 shows the details of 'add to supertype set'. Every type has associated with it a set of types which are super types. A class 'Derived' which inherits from class 'Base' will have itself and 'Base' in its supertype set. By the rules of subtyping, given objects 'ObjOfBaseType', and 'ObjOfDerivedType', the following can be asserted:

EXAMPLE 4

. . . 1 ObjOfBaseType=ObjOfDerivedType 'VALID assignment: base=derived
. . . 2 ObjOfDerivedType=ObjOfBaseType 'INVALID assignment: derived=base The assignment in Line 1 is valid because the inheritance relation guarantees that a 'Derived' object will support all the public services that its parent type 'Base' supports. However, because 'Derived' will add to what it inherits from 'Base', the reverse is not true. In Line 2 above, the assignment is invalid because 'ObjOfDerivedType' is required to support all of the public services in 'Derived' but if the source is 'ObjOfBaseType' this cannot be guaranteed. Because this assignment is invalid, and because the source and target languages use the same rules for subtyping and inheritance, such an assignment will never be seen in the input source program. In general, where a super type is expected, a derived type or super type can be used (Line 1), but where a derived type is expected, only the derived type, and not the super type, can be used (Line 2).

As shown in FIG. 6, the inputs to 'add to supertype set' are the symbols of two types: one is the type of the target and one is the type of the source (600). These arise from specific contexts in expressions present in the input source code. In an assignment, the right hand side is the source and the left hand side is the target. In a method invocation, the actual parameter is the source and the formal parameter is the target.

Interface types and class types are handled slightly differently in the calculation of the supertype set. If either source type or target type is an interface type, the target type is added to the supertype set of the source without any modification (605, 610). This is due to the fact that, for both the source and the target language for the embodiment of the translation method of the present invention, interface types support multiple inheritance and class types support single inheritance. That is, an interface can directly inherit from more than one interface whereas a class can inherit from only one class. This means that the translation method of the present invention can refine and make more precise the information in the supertype set in the case that both source and target types are class types, as will be shown with the example below.

EXAMPLE 5

```
1 Class Type1
2    inherits UndeclaredType1
3 End Class
4
5 Class Class1
6 Sub Main
7    Dim varUT2 As UndeclaredType2 = new Type1( )
8 End Sub
9 End Class
```

In Example 5, Line 7, by the rules of subtyping, 'Type1' must be a subtype of 'UndeclaredType2' in order to guarantee that the target 'varUT2' will support all the services in 'UndeclaredType2'. Thus, 'UndeclaredType2' is a super type of 'Type1'. But we know, from the parsing and lexical analysis of the input source code, that the direct parent of 'Type1' is 'UndeclaredType1'. If the direct parent of 'Type1' is 'UndeclaredType1' and 'UndeclaredType2' is a super type of 'Type1', then we know that a more precise expression of the super type relationships is that 'UndeclaredType2' is a super type of 'UndeclaredType1'. This is what the tests of (620, 630, 640) accomplish. For this example, upon exit from 'add to supertype set', the supertype set of 'UndeclaredType1' will contain 'UndeclaredType2' (650).

Recall that the analysis of the expression by one embodiment of the translation method of the present invention is performed through three steps, where the third step in the analysis of the expression is the calculation of the supertype set (470). The preceding discussion details the third step. Now the presentation of the third step of expression analysis, calculation of the supertype set, is complete.

The three steps in expression analysis by one embodiment of the translation method of the present invention work together to gather information for type inference. The example below shows how, for one embodiment, the calculation of the supertype set in step two works together with the type hierarchy inferred during the type hierarchy phase to yield information for type inference performed.

EXAMPLE 6

```
1 Class Class1
2 Sub Main
3    ' Definitions of all types are unavailable.
4    Dim ref As New Type1
5    Dim ObjDerived As New Derived
6    Dim ObjBase As New Base
7
8    ObjBase = ref.Type1__Fcn
9    ObjDerived = ref.Type1__Fcn
10 ObjBase = ObjDerived
11 End Sub
12 End Class
```

In Example 6, the variables are declared but none of their type definitions are available, in order to show more clearly the actions of type inference through the type inference phases.

First Type Inference Phase: Type Dependency Analysis

In the first type inference phase, type dependency analysis, the 'type inference controller' is called for lines 8, 9, and 10 (460) as shown in FIG. 4.

1. For lines 8 and 9, while 'Type1_Fcn' is undeclared, 'ObjBase' and 'ObjDerived' are declared, so the test in FIG. 7 fails (710) and the 'type inference controller' exits without adding anything to any unknown type set.
2. For line 10, both 'ObjBase' and 'ObjDerived' are declared, so the test in FIG. 7 fails (710) and the 'type inference controller' exits without adding anything to any unknown type set. During the type dependency phase for this example, nothing is added to any unknown type set.

Continuing in this phase of type dependency analysis, after calling the 'type inference controller' described above, the calculation of the supertype set takes place for lines 8, 9, and 10 (470) as shown in FIG. 4.

3. For lines 8 and 9, since 'Type1_Fcn' is undeclared and has not had any type inferred for it, nothing is added to any supertype set.
4. For line 10, both 'ObjBase' and 'ObjDerived' are declared, so 'add to supertype set' will add 'Base' to the supertype set of 'Derived' (650) as shown in FIG. 6.

Second Type Inference Phase: Type Inference

In the second phase, the phase of type inference, the 'type inference controller' is called for lines 8, 9, and 10 (460) as shown in FIG. 4.

1. For line 8, 'ObjBase' is considered 'finished' because it is declared, and therefore its type will never change as a result of type inference. However 'Type1_Fcn' is undeclared and no type has been inferred for it. Therefore, 'Type1_Fcn' gets the type of 'ObjBase' as its type (which is type 'Base').
2. For line 9, now both 'ObjBase' and 'Type1_Fcn' are considered 'finished' so no type inference takes place.
3. For line 10, no type inference takes place because both operands are considered 'finished' because they are declared.

Continuing in the type inference phase, after the call to the 'type inference controller' which is described above, the calculation of the supertype set takes place for lines 8, 9, and 10 (470) as shown in FIG. 4.

4. For line 10, the supertype set calculation has already been done and there is no change.
5. For line 8, since 'Type1_Fcn' and 'ObjBase' have the same type as a result of type inference, no change in the supertype sets take place.
6. For line 9, the operands have different types: 'Type1_Fcn' has type 'Base' and 'ObjDerived' has type 'Derived'. By the rules of subtyping, if the source and target of an assignment have different types, then the type of the target must be a super type of the type of the source. This would indicate that 'Derived' should be a supertype of 'Base' and that 'Derived' should be put in the supertype set of 'Base'. That contradicts the information from the assignment in line 10, which already added 'Base' to the supertype set of 'Derived' in the type dependency phase, as detailed above. In fact, adding 'Derived' to the supertype set of 'Base' would result in a cycle, because 'Base' is in the supertype set of 'Derived'. This type of situation can occur because the first result of type inference for 'Type1_Fcn' does not reflect the full information about the types implicit in the input source code; specifically, that 'Type1_Fcn' does not return 'Base' but instead returns a subtype of 'Base', which is 'Derived'. At this stage in the type inference analysis the type hierarchy of undeclared types has not been created and so one cannot make this distinction. As shown in FIG. 6, an initial check prevents such a cycle from occurring (601), because if 'add to supertype set' detects that the type of the source is contained in the closure of base and super types of the target, then 'add to supertype set' exits without updating the supertype set. This check prevents the propagation of incorrect type information while type inference analysis is incomplete.

Third Type Inference Phase: Type Hierarchy Inference

For one embodiment of the translation method of the present invention, the third phase, the phase of type hierarchy inference, occurs next. The 'type hierarchy inference controller' shown in FIG. 10 will be described in detail later. For the purposes of this example, it is enough to note that when this routine exits, there is a type hierarchy which specifies that 'Derived' is a class which inherits 'Base'.

Fourth Type Inference Phase: Final Type Inference

For one embodiment of the translation method of the present invention, the fourth phase, the phase of final type inference, occurs next. In this phase the 'type inference controller' is again called for lines 8, 9, and 10 (460) as shown in FIG. 4, and type inference occurs again. In this phase, types of undeclared objects may be updated with the subtyping information which is available as a result of type hierarchy inference in the previous phase (760, 761) as shown in FIG. 7.

1. For line 8, both operands are finished (740) as shown in FIG. 7, and this is the final type inference phase (750), but the operands do not have a subtyping relationship, as they both have the same type (760, 761) so the 'type inference controller' exits without changing any types.
2. For line 9, both operands are finished (740) and this is the final type inference phase (750), but in this case the operands do have a subtyping relationship. $T_t$ is 'Derived' and $T_s$ is 'Base', so $T_t$ is a subtype of $T_s$, and s (the source which in this case is 'Type1_Fcn') is undeclared. This satisfies the test in FIG. 7 (761), so 'Type1_Fcn' is updated to have type 'Derived' (771). This causes a type change so that 'Type1_Fcn' now returns 'Derived' instead of 'Base'.
3. For line 10, both operands are finished (740), and this is the final type inference phase (750); they do have a subtyping relationship but both are declared, so the 'type inference controller' exits without changing any types.

Here is the generated target code which expresses the results of type inference for one embodiment of the translation method of the present invention. (Note the inheritance relation in line 6 and the return type of 'Type1_Fcn' in line 9.)

EXAMPLE 7

```
1 public class Base {
2     public Base( )  { }
3 }
4 public class Derived extends Base  {
5     public Derived( )  { }
6 }
7 public class Type1 {
8     public Type1( )  { }
9     public Derived Type1_Fcn( )  { return null;  }
10 }
11 class Class1  {
12    public static void main(String[ ] args)  {
13        // Definitions of all types are unavailable.
14        Type1 ref = new Type1  ( );
15        Derived ObjDerived = new Derived ( );
```

-continued

```
16      Base ObjBase = new Base ( );
17      ObjBase = ref.Type1__Fcn( );
18      ObjDerived = ref.Type1__Fcn( );
19      ObjBase = ObjDerived;
20   }
21 }
```

Additional discussion of the Final Type Inference Phase

Type inference in all the phases has been shown in Example 6. For final type inference, the case shown in FIG. 7, step 761, has been specifically presented, but the case for FIG. 7, step 760, has not been specifically presented. Before the case in FIG. 7, step 760, is specifically presented, the case in FIG. 7, step 761, will be reviewed.

In the presentation of Example 6 above, in the second type inference phase, step 1, it is shown how the return type of the function 'Type1_Fcn' is inferred to be 'Base'. In the fourth type inference phase, step 2, this type inference is revisited, and the return type of the function 'Type1_Fcn' is inferred to be 'Derived'. In an input source program that has an object of undeclared type used as a source operand, the final inferred type of the source operand should be the most specific of the types of the operands to which this source operand is assigned. This is required by the rules of subtyping. It insures that the assignment of source to object will be valid in all instances (see Example 4). This is precisely the condition that is checked in FIG. 7, step 761.

The case shown in FIG. 7, step 760, occurs when the undeclared object is a target operand instead of a source operand. In an input source program that has an object of undeclared type used as a target operand, the final inferred type of the target operand should be the least specific of the types of the operands which are assigned to this target operand. This is required by the rules of subtyping. It insures that the assignment of source to object will be valid in all instances (see Example 4). This is precisely the condition that is checked in FIG. 7, step 760. Example 8 presents such a case in detail.

In Example 8, the target operand is the parameter to 'Type1_fcn2'. The source operands for this target are 'Obj-Derived' and 'ObjBase', respectively. The first assignment in Line 8 results in the parameter to 'Type1_fcn2' getting the type 'Derived' (in the second phase of type inference). In the final type inference phase, this is revisited, and the type of the parameter to 'Type1_fcn2' is updated to 'Base', because the conditions in FIG. 7, step 760, are true.

EXAMPLE 8

```
1 Class Class1
2 Sub Main
3      ' Definitions of all types are unavailable.
4      Dim ref As New Type1
5      Dim ObjDerived As New Derived
6      Dim ObjBase As New Base
7      ObjBase = ObjDerived
8      ref.Type1__fcn2(ObjDerived)
9      ref.Type1__fcn2(ObjBase)
10
11 End Sub
12 End Class
```

The detailed presentation of type dependency analysis and type inference analysis is now complete.

Discussion of Type Hierarchy Inference

Figure 10:
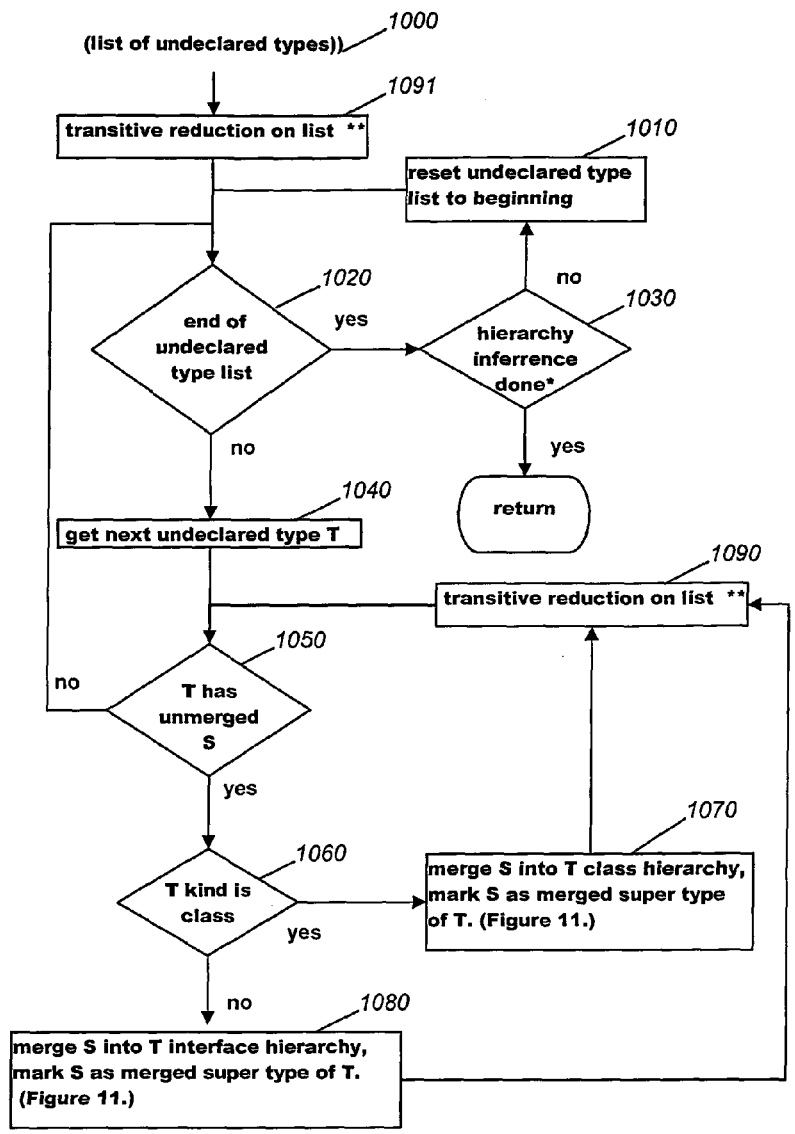
FIG. 10 shows a flow chart of steps of the translation method of the present invention performing type hierarchy inference.

With reference to FIG. 10, a flow chart of one embodiment of the translation method of the present invention performing type hierarchy inference is shown. Other phases of the translation method of the present invention (that is, the type dependency, type inference, and final type inference phases) are performed during a traversal of the input source tree(s). (See FIG. 2). In one preferred embodiment of the translation method of the present invention, type hierarchy inference does not require a traversal of the source tree. Type hierarchy inference takes as input a list of all the undeclared types which the translation method of the present invention has detected (1000). Each of these types has associated with it a set of super types, created by 'add to supertype set' as shown in FIG. 6.

The 'type hierarchy inference controller' creates a valid hierarchy for the undeclared types from the supertype sets. In one embodiment of the translation method of the present invention the 'type hierarchy inference controller' performs the following steps. It first simplifies the supertype sets of each undeclared type by performing a transitive reduction on the supertype set of each undeclared type (1091) as shown in FIG. 10. This transitive reduction operation takes a supertype set such as $\{S_1, S_2, S_3\}$ and if $S_3 <: S_1$ (that is, $S_3$ is a subtype of $S_1$) then $S_1$ can be removed from the supertype set with no loss of information. Next, for each undeclared type (1040), the 'type hierarchy inference controller' checks its supertype set, and if it has a super type that has not been merged into its type hierarchy (1050), it merges that super type into the type hierarchy (1070, 1080). After each merge, another transitive reduction on the list of undeclared types takes place (1090). In the preferred embodiment of the translation method of the present invention, undeclared types default to having the type of class (1070).

If every undeclared type has been merged (1050), and type hierarchy inference is not complete, the 'type hierarchy inference controller' resets to the beginning of the undeclared type list and continues merging for another iteration through the list of undeclared types (1010). Type hierarchy inference is complete when all the super types in the supertype set of each undeclared type are expressed in the type hierarchy of that undeclared type (1030).

Figure 11:
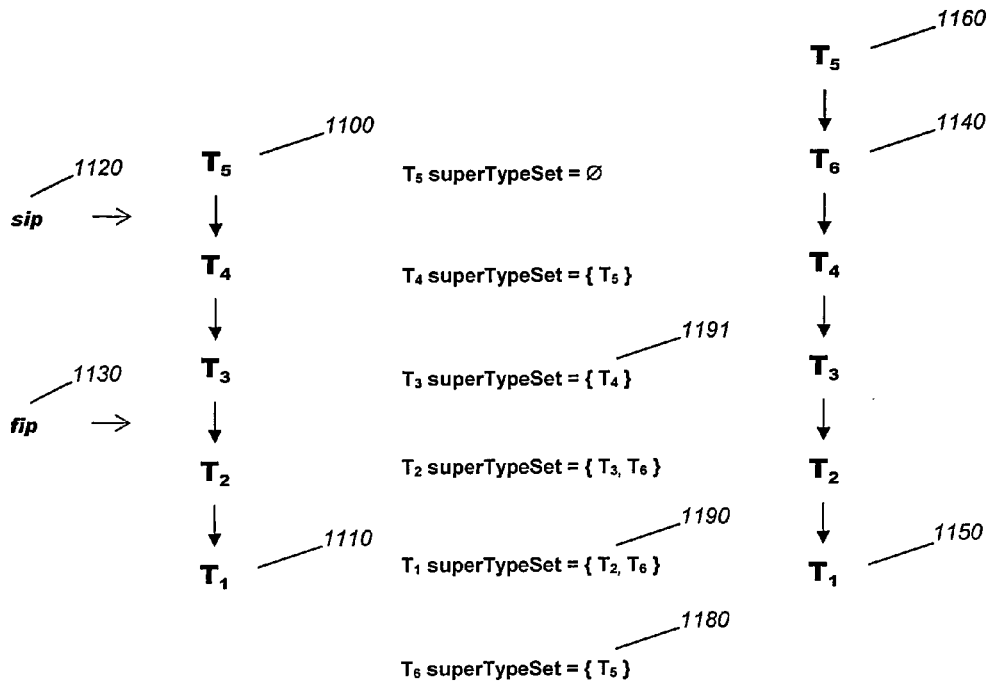
FIG. 11 illustrates the algorithm associated with steps of the translation method of the present invention for ordering the inferred type hierarchy of the types whose definitions are not available in the input source code.

With reference to FIG. 11, a flow chart is shown of one embodiment of the translation method of the present invention performing the merge of a super type '$T_6$', which is a member of the supertype set of '$T_1$' (1190), into the hierarchy of '$T_1$' (1110). In one embodiment, the translation method of the present invention analyzes the existing hierarchy of the undeclared type '$T_1$' (1110) and finds two insertion points. The first insertion point (1130) is found by traversing in order the parents of '$T_1$' and finding the first parent of '$T_1$' which does not have '$T_6$' in its supertype set (1191). ('$T_6$' could not be inserted below a type in the hierarchy which has '$T_6$' as a super type.) The second insertion point (1120) is found by traversing in order the parents of the first insertion point and finding the first parent of the first insertion point which is contained in the supertype set of '$T_6$' (1180). ('$T_6$' should be inserted below a type in the hierarchy which the supertype set of '$T_6$' shows as a super type of '$T_6$'.) Following these rules, the translation method of the present invention chooses the final insertion point (1140). These steps are detailed in 1170. Note that the first insertion point always exists, because the merge takes an undeclared type and a type from its supertype set. The second insertion point may or may not exist. If it does exist, it is the final insertion point; otherwise the first insertion point is the final insertion point.

The detailed presentation of type hierarchy inference analysis is now complete. The phases of one embodiment of the translation method of the present invention of type dependency, type inference, type hierarchy inference, and final type inference have all been presented in detail, and the presentation of those phases is complete.

In one embodiment of the translation method of the present invention there is a final phase, the translate phase (250) shown in FIG. 2, which utilizes the results of type inference. During the translate phase, the translation method of the present invention traverses the input parse trees and performs the translation, generating all files for the target directories for source namespaces (190) as shown in FIG. 1, and generating all files for the translation interfaces directory (191). The translation interfaces directory (191) will contain any needed bridge classes (130, 150, 160, 180, 181), as well as classes and interfaces for undeclared types (140, 160). The results of all phases of type inference in the preferred embodiment of the translation method of the present invention will be reflected in the contents of the translation interfaces directory (191).

Figure 19:
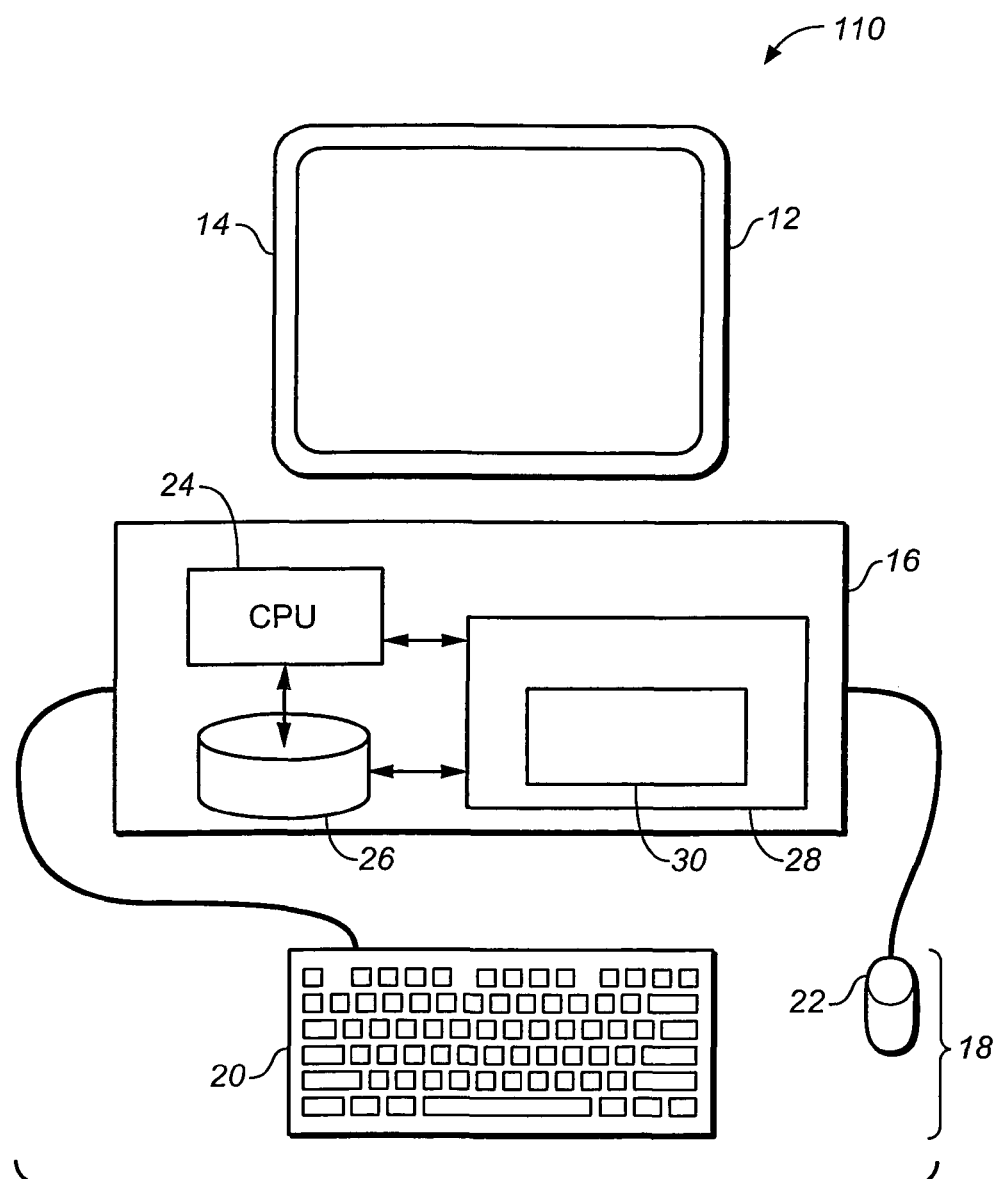
FIG. 19 is a block diagram illustrating an example of a translation system in accordance with one embodiment of the present invention.

FIG. 19 is a block diagram illustrating an example of a translation system 10 in accordance with one embodiment of the present invention implemented on a personal computer 12. In particular, the personal computer 12 may include a display unit 14, which may be a cathode ray tube (CRT), a liquid crystal display, or the like; a processing unit 16; and one or more input/output devices 18 that permit a user to interact with the software application being executed by the personal computer. In the illustrated example, the input/output devices 18 may include a keyboard 20 and a mouse 22, but may also include other peripheral devices, such as printers, scanners, and the like. The processing unit 16 may further include a central processing unit (CPU) 24, a persistent storage device 26, such as a hard disk, a tape drive, an optical disk system, a removable disk system, or the like, and a memory 28. The CPU 24 may control the persistent storage device 26 and memory 28. Typically, a software application may be permanently stored in the persistent storage device 26 and then may be loaded into the memory 28 when the software application is to be executed by the CPU 24. In the example shown, the memory 28 may contain a translation tool 30. The translation tool 30 may be implemented as one or more software modules that are executed by the CPU 24. In accordance with the present invention, the translation system 10 may also be implemented using hardware and may be implemented on different types of computer systems, such as client/server systems, Web servers, mainframe computers, workstations, and the like.

Thus, the present invention provides, in various embodiments, a method and system for translating source code in one logically distinct object oriented language on one platform into another object oriented language on another platform. Once the source code classes are translated, a complete object oriented interface to the target platform is generated. This includes the translation of the classes and statements in the original source. It also includes object oriented interfaces for all types and services used in the source code whose definitions are not provided; these interfaces are located in the translation interfaces directory. This enables a fundamental goal of object oriented language design, which is code reuse, across platforms.

The forgoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications that are suited to the particular use contemplated. It is intended that the scope of the invention be defined by the claims appended hereto and their equivalents. While the invention has been described in terms of preferred embodiments, those skilled in the art will recognize that the invention can be practiced with modifications within the spirit and scope of the appended claims.

What is claimed is:

1. A method for translating input source code in one logically distinct object oriented language on one platform into another object oriented language on another platform, comprising the steps of:

providing an input source parse tree corresponding to each input source code type definition or module definition and a symbol table about all type definitions and other names defined in the input source code;

performing, in a first type inference phase, a type dependency analysis on the input source parse tree, in which it is noted which objects of unknown type share a type;

performing, in a second type inference phase, type inference analysis on the input source parse tree, in which members of classes whose definition is not available in the input source code have their types and signatures inferred from their use, and propagating inferred types to any objects of unknown type which share the inferred type;

determining from the characteristics of the use of undeclared names, what kind of names they are;

analyzing the types of the source and target operands in expressions and recording the inferred subtyping relationship in the supertype set;

performing, in a third type inference phase, a type hierarchy analysis on all types referenced in the input source code whose definition is not available, in which a hierarchy for those types is detected and defined;

performing, in a fourth type inference phase, a final type inference analysis on the input source parse tree, in which the results of the type hierarchy analysis is used to refine the inferred types;

performing, in a translate phase, a tree traversal on the input source parse tree and generating the translated code for the classes and statements in the input source code; and generating the translation interfaces directory and its contents for platform references and types whose definition is unavailable in the original source, wherein the results of all phases of type inference are reflected in the contents of the translation interfaces directory.

2. The method of claim 1 wherein providing the input source parse tree corresponding to each input source code type definition or module definition and a symbol table about all type definitions and other names defined in the input source code comprises the steps of:

performing a lexical and syntactic analysis of the input source code;

entering the information about all type definitions and other names defined in the input source code into the symbol table; and transforming each input source code type definition or module definition into a parse tree.

3. A system for translating input source code in one logically distinct object oriented language on one platform into another object oriented language on another platform, comprising a processing unit configured to execute instructions when executed cause the system to perform the steps of:

providing an input source parse tree corresponding to each input source code type definition or module definition and a symbol table about all type definitions and other names defined in the input source code;

performing, in a first type inference phase, a type dependency analysis on the input source parse tree, in which it is noted which objects of unknown type share a type;

performing, in a second type inference phase, type inference analysis on the input source parse tree, in which members of classes whose definition is not available in the input source code have their types and signatures inferred from their use, and propagating inferred types to any objects of unknown type which share the inferred type;

determining from the characteristics of the use of undeclared names, what kind of names they are;

analyzing the types of the source and target operands in expressions and recording the inferred subtyping relationship in the supertype set;

performing, in a third type inference phase, a type hierarchy analysis on all types referenced in the input source code whose definition is not available, in which a hierarchy for those types is detected and defined;

performing, in a fourth type inference phase, a final type inference analysis on the input source parse tree, in which the results of the type hierarchy analysis is used to refine the inferred types;

performing, in a translate phase, a tree traversal on the input source parse tree and generating the translated code for the classes and statements in the input source code; and generating the translation interfaces directory and its contents for platform references and types whose definition is unavailable in the original source, wherein the results of all phases of type inference are reflected in the contents of the translation interfaces directory.

4. The system of claim 3 wherein providing the input source parse tree corresponding to each input source code type definition or module definition and a symbol table about all type definitions and other names defined in the input source code comprises:

performing a lexical and syntactic analysis of the input source code;

entering the information about all type definitions and other names defined in the input source code into the symbol table; and transforming each input source code type definition or module definition into a parse tree.

* * * * *